United States Patent
Taherzadeh Boroujeni et al.

(10) Patent No.: US 11,751,083 B2
(45) Date of Patent: Sep. 5, 2023

(54) TECHNIQUES FOR LAYER ONE REPORTING IN WIRELESS COMMUNICATIONS SYSTEMS

(71) Applicant: QUALCOMM Incorporated, San Diego, CA (US)

(72) Inventors: Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 161 days.

(21) Appl. No.: 17/231,950

(22) Filed: Apr. 15, 2021

(65) Prior Publication Data

US 2022/0338046 A1 Oct. 20, 2022

(51) Int. Cl.
| | |
|---|---|
| *H04W 24/10* | (2009.01) |
| *H04B 17/318* | (2015.01) |
| *H04B 17/345* | (2015.01) |
| *H04B 7/0408* | (2017.01) |
| *H04B 7/0417* | (2017.01) |

(52) U.S. Cl.
CPC .......... *H04W 24/10* (2013.01); *H04B 7/0408* (2013.01); *H04B 17/318* (2015.01); *H04B 17/345* (2015.01); *H04B 7/0417* (2013.01)

(58) Field of Classification Search
None
See application file for complete search history.

(56) References Cited

U.S. PATENT DOCUMENTS

| | | |
|---|---|---|
| 2017/0214444 A1 | 7/2017 | Nigam et al. |
| 2019/0058517 A1 | 2/2019 | Kang et al. |

FOREIGN PATENT DOCUMENTS

WO WO-2018204863 A1 11/2018

OTHER PUBLICATIONS

International Search Report and Written Opinion—PCT/US2022/020308—ISA/EPO—dated Jul. 1, 2022.
(Continued)

*Primary Examiner* — Walter J Divito
(74) *Attorney, Agent, or Firm* — Dalei Dong; Holland & Hart LLP

(57) ABSTRACT

Methods, systems, and devices for wireless communication are described. For example, the described techniques provide for a base station to determine and indicate to a UE (e.g., via control signaling) a configuration for layer one (L1) reporting of non-serving cells including, for example, a number of beams or cells for which the UE is to report metrics. The UE may receive the control signaling and measure or otherwise obtain metrics for beams of a serving cell of the UE, at least one non-serving cell of the UE, or beams of a non-serving cell of the UE. The UE may also identify an index associated with at least the one non-serving cell or indices of beams of the non-serving cell which the UE may use to identify the metrics in a L1 report. Accordingly, the UE may generate and transmit an L1 report to the base station.

30 Claims, 19 Drawing Sheets

(56) References Cited

OTHER PUBLICATIONS

Nokia., et al., "Enhancements on Multi-Beam Operation", 3GPP TSG RAN WG1 #104-Bis-e, 3GPP Draft, R1-2103365, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 6, 2021 (Apr. 6, 2021), 36 Pages, XP051993390, Retrieved from the Internet: URL: https://ftp.3gpp.org/tsg_ran/WG1_RL1/TSGR1_104b-e/Docs/R1-2103365.zip, [retrieved on Apr. 6, 2021], Section 2.2.3.4.

Samsung: "Enhancements on Multi-TRP Inter-Cell Operation", 3GPP TSG RAN WG1 #104-e, 3GPP Draft, R1-2101188, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 18, 2021 (Jan. 18, 2021), 3 Pages, XP051970705, Retrieved from the Internet: URL: https://ftp.3gpp.org/tsg_ran/WG1_RL1/TSGR1_104-e/Docs/R1-2101188.zip, [retrieved on Jan. 18, 2021], The whole document.

TECHNIQUES FOR LAYER ONE REPORTING IN WIRELESS COMMUNICATIONS SYSTEMS

FIELD OF DISCLOSURE

The present disclosure, for example, relates to wireless communication, including techniques for layer one reporting in wireless communications systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems, such as systems which support beamformed communications, may support devices using and switching between beams of multiple cells. Switching between beams of multiple cells may be enabled by frequency report of metrics associated with the beams. It may be beneficial to implement a method whereby devices may frequently report metrics associated with non-serving cells or beams thereof.

SUMMARY

The described techniques relate to improved methods, systems, devices, and apparatuses that support techniques for layer one reporting in wireless communications systems. For example, the described techniques provide for a base station to determine and indicate to a UE (e.g., via control signaling) a configuration for layer one (L1) reporting of non-serving cells including, for example, a number of beams or cells for which the UE is to report metrics. The UE may receive the control signaling and measure or otherwise obtain metrics for beams of a serving cell of the UE, at least one non-serving cell of the UE, or beams of a non-serving cell of the UE. The UE may also identify an index associated with at least the one non-serving cell or indices of beams of the non-serving cell (e.g., a joint or long index including a cell index and a beam index) which the UE may use to identify the metrics in a L1 report. Accordingly, the UE may generate and transmit an L1 report to the base station. Implementing aspects of the present disclosure may enable switching between beams of different cells in wireless communications systems, which may lead to an increased reliability, a reduced resource utilization, or an increased efficiency, among other benefits.

A method for wireless communication at a user equipment (UE) is described. The method may include receiving control signaling from a base station, the control signaling indicating a configuration for transmitting, from the UE, a L1 report associated with a set of beams of a serving cell of the UE and with a non-serving cell of the UE, generating the L1 report based on the configuration, the L1 report based on a metric associated with the set of beams of the serving cell of the UE and with the non-serving cell of the UE, and transmitting the generated L1 report to the base station.

An apparatus for wireless communication at a UE is described. The apparatus may include a processor, memory coupled with the processor, and instructions stored in the memory. The instructions may be executable by the processor to cause the apparatus to receive control signaling from a base station, the control signaling indicating a configuration for transmitting, from the UE, a L1 report associated with a set of beams of a serving cell of the UE and with a non-serving cell of the UE, generate the L1 report based on the configuration, the L1 report based on a metric associated with the set of beams of the serving cell of the UE and with the non-serving cell of the UE, and transmit the generated L1 report to the base station.

Another apparatus for wireless communication at a UE is described. The apparatus may include means for receiving control signaling from a base station, the control signaling indicating a configuration for transmitting, from the UE, a L1 report associated with a set of beams of a serving cell of the UE and with a non-serving cell of the UE, means for generating the L1 report based on the configuration, the L1 report based on a metric associated with the set of beams of the serving cell of the UE and with the non-serving cell of the UE, and means for transmitting the generated L1 report to the base station.

A non-transitory computer-readable medium storing code for wireless communication at a UE is described. The code may include instructions executable by a processor to receive control signaling from a base station, the control signaling indicating a configuration for transmitting, from the UE, a L1 report associated with a set of beams of a serving cell of the UE and with a non-serving cell of the UE, generate the L1 report based on the configuration, the L1 report based on a metric associated with the set of beams of the serving cell of the UE and with the non-serving cell of the UE, and transmit the generated L1 report to the base station.

Some examples of the method, apparatuses, and non-transitory computer-readable medium described herein may further include operations, features, means, or instructions for receiving, from the base station, an indication of a number of beams of the serving cell and a number of beams of the non-serving cell, where the L1 report includes an indication of the metric for each of the number of beams of the set of beams of the serving cell and for each of the number of beams of the set of beams of the non-serving cell.

Some examples of the method, apparatuses, and non-transitory computer-readable medium described herein may further include operations, features, means, or instructions for determining the metric for each beam of the set of beams of the serving cell of the UE and for the non-serving cell of the UE, where the L1 report includes an indication of the metric for a subset of the set of beams and for the non-serving cell of the UE.

In some examples of the method, apparatuses, and non-transitory computer-readable medium described herein, determining the metric for the non-serving cell of the UE may include operations, features, means, or instructions for determining the metric for each beam of a set of beams of the non-serving cell, where the L1 report includes an indication of the metric associated with a beam of the set of beams for which the metric may be highest.

In some examples of the method, apparatuses, and non-transitory computer-readable medium described herein, determining the metric for the non-serving cell of the UE may include operations, features, means, or instructions for determining the metric for each beam of a set of beams of the non-serving cell, where the L1 report includes an indication of an aggregate value of the metric for each beam of the set of beams of the non-serving cell.

Some examples of the method, apparatuses, and non-transitory computer-readable medium described herein may further include operations, features, means, or instructions for determining an index of the non-serving cell and an index of a beam of the non-serving cell and determining a joint index including the index of the non-serving cell and the index of the beam of the non-serving cell, where the L1 report includes the joint index.

Some examples of the method, apparatuses, and non-transitory computer-readable medium described herein may further include operations, features, means, or instructions for determining an index of the non-serving cell, where the L1 report includes the index.

In some examples of the method, apparatuses, and non-transitory computer-readable medium described herein, the index includes a physical cell identifier associated with the non-serving cell or an identifier of the non-serving cell relative to a set of cells configured for the UE.

In some examples of the method, apparatuses, and non-transitory computer-readable medium described herein, the metric includes a reference signal received power or a signal-to-interference-plus-noise ratio.

A method for wireless communication at a base station is described. The method may include transmitting control signaling to a UE, the control signaling indicating a configuration for the UE to transmit a L1 report associated with a set of beams of a serving cell of the UE and associated with a non-serving cell of the UE and receiving the L1 report from the UE in response to transmitting the control signaling.

An apparatus for wireless communication at a base station is described. The apparatus may include a processor, memory coupled with the processor, and instructions stored in the memory. The instructions may be executable by the processor to cause the apparatus to transmit control signaling to a UE, the control signaling indicating a configuration for the UE to transmit a L1 report associated with a set of beams of a serving cell of the UE and associated with a non-serving cell of the UE and receive the L1 report from the UE in response to transmitting the control signaling.

Another apparatus for wireless communication at a base station is described. The apparatus may include means for transmitting control signaling to a UE, the control signaling indicating a configuration for the UE to transmit a L1 report associated with a set of beams of a serving cell of the UE and associated with a non-serving cell of the UE and means for receiving the L1 report from the UE in response to transmitting the control signaling.

A non-transitory computer-readable medium storing code for wireless communication at a base station is described. The code may include instructions executable by a processor to transmit control signaling to a UE, the control signaling indicating a configuration for the UE to transmit a L1 report associated with a set of beams of a serving cell of the UE and associated with a non-serving cell of the UE and receive the L1 report from the UE in response to transmitting the control signaling.

Some examples of the method, apparatuses, and non-transitory computer-readable medium described herein may further include operations, features, means, or instructions for transmitting, to the UE, an indication of a number of beams of the serving cell and a number of beams of the non-serving cell, where the L1 report includes an indication of the metric for each of the number of beams of the serving cell and for each of the number of beams of the non-serving cell.

Some examples of the method, apparatuses, and non-transitory computer-readable medium described herein may further include operations, features, means, or instructions for receiving an indication of a metric for a subset of the set of beams of the serving cell and for a the non-serving cell of the UE, where the L1 report includes the indication.

Some examples of the method, apparatuses, and non-transitory computer-readable medium described herein may further include operations, features, means, or instructions for receiving an indication of the metric for a beam of the non-serving cell for which the metric may be highest, where the L1 report includes the indication.

Some examples of the method, apparatuses, and non-transitory computer-readable medium described herein may further include operations, features, means, or instructions for receiving an indication of an aggregate value of the metric for a set of beams of the non-serving cell, where the L1 report includes the indication.

In some examples of the method, apparatuses, and non-transitory computer-readable medium described herein, the metric includes a reference signal received power or a signal-to-interference-plus-noise ratio.

Some examples of the method, apparatuses, and non-transitory computer-readable medium described herein may further include operations, features, means, or instructions for receiving a joint index including an index of the non-serving cell and an index of beam of the non-serving cell, where the L1 report includes the joint index.

Some examples of the method, apparatuses, and non-transitory computer-readable medium described herein may further include operations, features, means, or instructions for receiving an index of the non-serving cell, where the L1 report includes the index.

In some examples of the method, apparatuses, and non-transitory computer-readable medium described herein, the index includes a physical cell identifier of the non-serving cell or an identifier of the non-serving cell relative to a set of cells configured for the UE.

DETAILED DESCRIPTION

Figure 1:
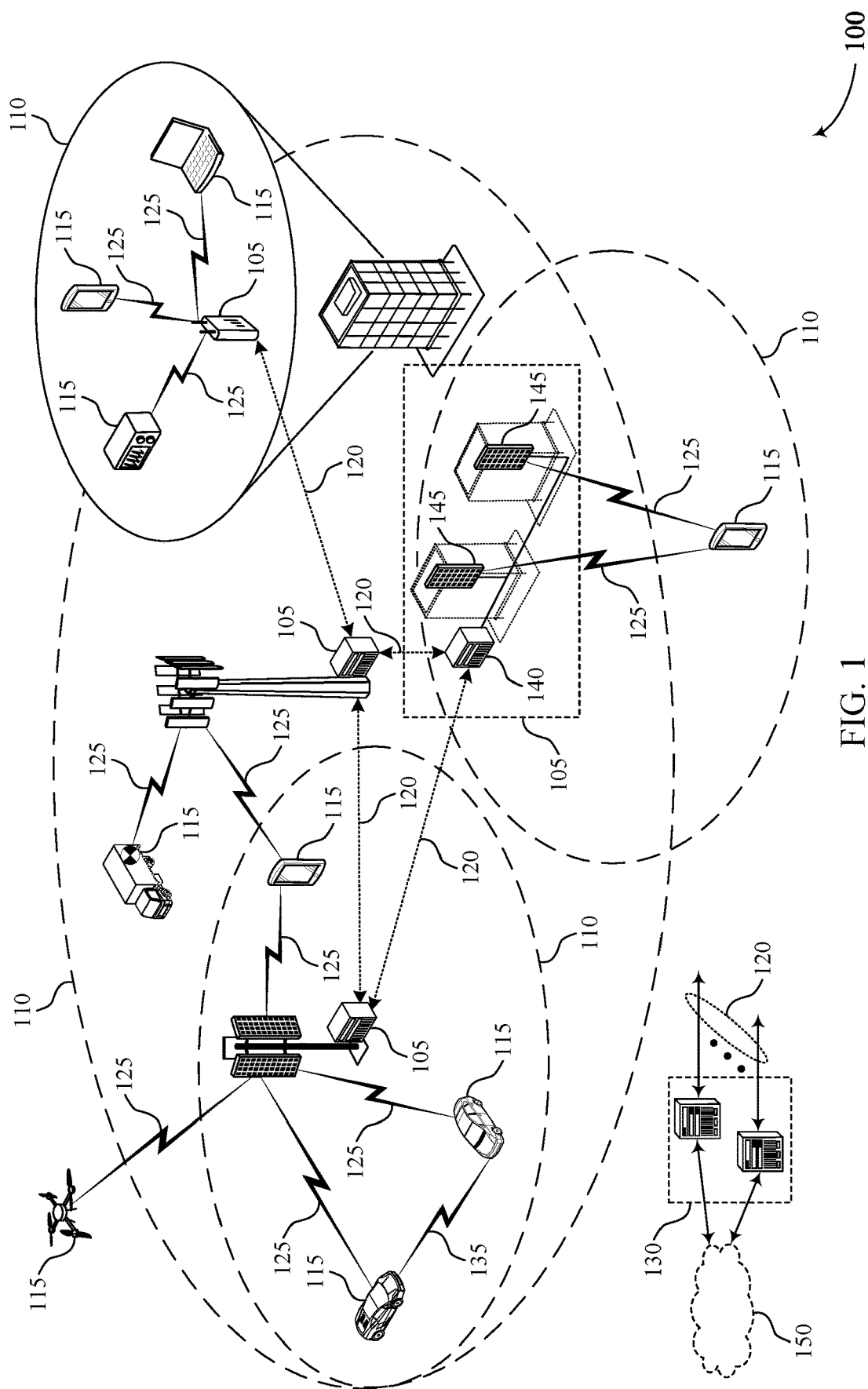
FIG. 1 illustrates an example of a wireless communications system that supports techniques for layer one reporting in wireless communications systems in accordance with aspects of the present disclosure.

Some wireless communications systems, such as fifth generation (5G) New Radio (NR) systems, support devices using and switching between beams of different cells (e.g., may implement cell-free multiple input multiple output (MIMO) using multiple transmit-receive points (TRPs)). For example, a base station may indicate a user equipment (UE) to switch from a beam of a serving cell (e.g., a primary cell) of the UE to a beam of a non-serving cell of the UE if the beam of the non-serving cell exhibits a higher reliability Devices may use frequent reporting of metrics (e.g., a higher reference signal received power (RSRP) or a higher signal-to-interference-plus-noise ratio (SINR)) for different beams to enable support for fast switching between beams of different cells. For example, a UE may use layer one (L1) reporting to provide frequency, beam-level reporting of metrics for beams of different cells. However, reporting metrics and associated beam indices or cell identifiers may lead to a high signaling overhead and an inefficient use of communications resources. It may be beneficial to implement a method for L1 reporting of metrics for non-serving cells.

One such method may include a base station configuring a UE to provide an L1 report for a set of beams of a serving cell of the UE and for anon-serving cell of the UE. For example, the base station may transmit control signaling indicating the UE to provide metrics for a number of beams of the serving cell, a cell-level for the non-serving, or metrics for a number of beams of the non-serving cell. The UE may measure or otherwise determine the metrics (e.g., RSRP or SINR) for beams of the serving cell and for the non-serving cell and may generate a L1 report based on the metrics. In some examples, the UE may report metrics for a number of beams of the non-serving cell (e.g., as indicated by the base station). In some implementations, the UE may report a metric for a beam of the non-serving cell for which the metric is highest (e.g., a most reliable beam). Additionally or alternatively, the UE may report an aggregate value of metrics for a set of beams of the non-serving cell. In some examples, the UE may also indicate an index of the non-serving cell. For example, the UE may include a physical cell identifier of the non-serving cell in the L1 report. Similarly, the UE may indicate an index of the non-serving cell relative to a set of cells configured (e.g., pre-defined by a layer three (L3) measurement report or other higher layer signaling from the base station) for the UE. In some examples, the UE may use a joint or long index which includes an index of the non-serving cell and an index of a beam of the non-serving cell to identify a beam for which the UE is reporting a metric. Implementing aspects of the present disclosure may provide for frequent reporting of beam- and cell-level metrics for non-serving cells which may enable support for fast switching techniques, leading to an increased efficiency or an increased reliability, among other benefits.

Aspects of the disclosure are initially described in the context of wireless communications systems. Aspects of the disclosure are further described in the context of a process flow in a system. Aspects of the disclosure are further illustrated by and described with reference to apparatus diagrams, system diagrams, and flowcharts that relate to techniques for L1 reporting in wireless communications systems.

FIG. 1 illustrates an example of a wireless communications system 100 that supports techniques for L1 reporting in wireless communications systems in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell may cover a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). For example, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at some orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

Some examples of the wireless communication system 100 may support performing handover or beam switching procedures based on lower layer (e.g., L1 or layer two (L2)) reporting. L1 may be referred to as a physical layer which handles functions such as modulation and demodulation of physical channels (e.g., physical uplink shared channel (PUSCH), physical uplink control channel (PUCCH), etc.). L2 may be referred to as a MAC, RLC, or PDCP layer which handle functions such as beam management, random access procedures, mapping between logical and physical channels, etc. In some examples, an L1 report (e.g., a channel state information (CSI) report) may include a SINR (e.g., L1-SINR) or RSRP (e.g., L1-RSRP) measurements for different beams of a serving cell. For example, a UE 115 may report measurement for up to four beams in a configured L1 report. In some implementations, the UE 115 may report an absolute measurement for a beam which has a highest metric and may report differential measurements for the remaining beams.

Using L1 reporting, for example, may enable frequent reporting of metrics such that the wireless communications system 100 may support fast switching procedures which may lead to an increased efficiency or reliability of communications. If the wireless communications system 100 supports cell-free MIMO (e.g., using and switching between beams of different cells using multiple TRPs), it may be advantageous to use L1 reporting of beams for different cells.

For example, a base station 105 may transmit control signaling to a UE 115 indicating a configuration for the UE 115 to transmit a L1 report. In some examples, the configuration may include a number of beams or cells for which the UE 115 is to report metrics (e.g., RSRP or SINR). The UE 115 may determine metrics for a set of beams of a serving cell, at least one non-serving cell, or for beams of non-serving cells. In some implementations, the UE 115 may also determine indices for non-serving cells (e.g., a physical cell identifier or index relative to a set of configured cells) or for beams of non-serving cells (e.g., a long or joint index) and may use the UE 115 to identify metrics in a L1 report. Accordingly, the UE 115 may generate the L1 report using the metrics and indices and may transmit the L1 report to the base station 105. The UE 115 may use the L1 report to determine whether to indicate the UE 115 to perform a handover or beam switching procedure. Implementing aspects of the present disclosure may enable fast switching between beams of multiple cells and may lead to an increased reliability, an increased efficiency, or a reduced resource utilization, among other benefits.

Figure 2:
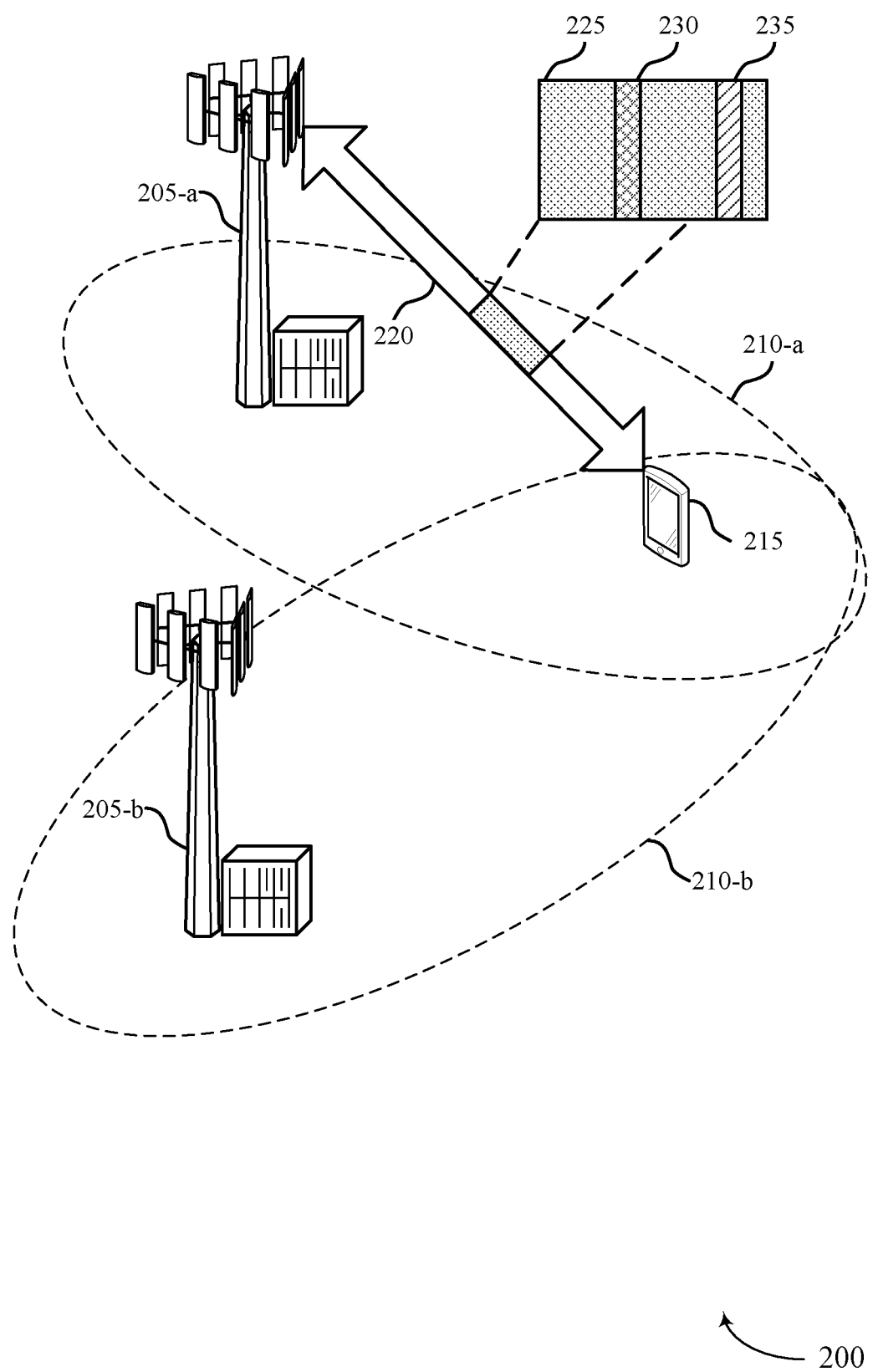
FIG. 2 illustrates an example of a wireless communications system that supports techniques for layer one reporting in wireless communications systems in accordance with aspects of the present disclosure.

FIG. 2 illustrates an example of wireless communications system 200 that supports techniques for L1 reporting in wireless communication systems, in accordance with various aspects of the present disclosure. In some examples, the wireless communication system may implement aspects of the wireless communications system 100 as described with reference to FIG. 1. The wireless communication system 200 may include a UE 215 which may be an example of a UE 115 as described with reference to FIG. 1. The wireless communications system 200 may also include a base station 205-a and a base station 205-b which may be examples of a base station 105 as described with reference to FIG. 1. The base station 205-a may be associated with a cell providing wireless communications service within a coverage area 210-a. Similarly, the base station 205-b may be associated with a cell providing wireless communication service within a coverage area 210-b. The base station 205-a and the UE 215 may share information via a communication link 220. In some examples, the wireless communications system 200 may support cell-free MIMO using multiple TRPs such that the UE 15 may be configured to use or switch between beams associated with the base station 205-a and beams associated with the base station 205-b. To enable switching between beams, the wireless communications system 200 may implement L1 reporting techniques for non-serving cells.

One method for L1 reporting of non-serving cells includes the base station 205 transmitting control signaling (e.g., downlink control information (DCI) to the UE 215 indicating a configuration for L1 reporting of non-serving cells. For example, the base station 205 may determine a number of beams of a serving cell for which the UE 215 is to report metrics (e.g., RSRP or SINR). The base station 205 may also determine a number of non-serving cells or a number of beams of non-serving cells for which the UE 215 is to report metrics. Accordingly, the UE 215 may determine the metrics for the beams of the serving cell and for the non-serving cells (e.g., at a cell-level or for beams of a non-serving cell). In some examples, the UE 215 may measure or otherwise determine an aggregate value of the metrics for a set of beams of a non-serving cell or may identify a beam of a non-serving cell for which the metrics are highest. In some examples, the UE 215 may also identify an index (e.g., a physical cell identifier) of the non-serving cell or a joint or long index of a beam of the non-serving cell such that the index is used to identify metrics included in an L1 report 225. The UE 215 may generate the L1 report 225 that includes a cell-level metric for a non-serving cell, beam-level metrics for a number of beams of non-serving cells, or a beam-level metrics for a number of beams of the serving cell of the UE 215. For example, the UE 215 may include, in the L1 report 225, a metric 235 for a non-serving cell or a beam of a non-serving cell and an index 230 identifying the non-serving or the beam of the non-serving cell.

In some examples, as shown in Table 1, the UE 215 may generate the L1 report 225 such that the L1 report 225 includes metrics for a beams of the serving cell of the UE 215 and cell-level metrics for at least one non-serving cell of the UE 215. The report may include an indicator of a CSI report number N associated with the L1 report 225, as well as CSI fields for reporting metrics of different beams or cells. The report may include an identifier (e.g., a CSI reference signal (CSI-RS) resource indicator (CRI) or synchronization signal resource block indicator (SSBRI)) for beams (e.g., for three beams as in the example of Table 1) of the serving cell of the UE 215 and an index (e.g., a physical cell identifier) of a non-serving cell of the UE 215 for which the UE 215 is reporting metrics.

TABLE 1

| CSI Report Number | CSI Fields |
| --- | --- |
| CSI Report N | CRI or SSBRI #1 |
| | CRI or SSBRI #2 |
| | CRI or SSBRI #3 |
| | Index #4 (Cell Index for Cell-Level Value) |
| | RSRP #1 |
| | Differential RSRP #2 |
| | Different RSRP #3 |
| | Differential RSRP #4 (Cell-Level) |

Accordingly, the L1 report 225 may include an absolute metric for one beam of the serving cell and a differential metric for the other beams of the serving cell and for the non-serving cell. In some examples, the differential metric for the non-serving cell may be positive or negative. In some implementations, a location of cell-level metrics of non-serving cells in the L1 report 225 may be fixed regardless of values of the metrics with respect to other beams or cells for which the UE 215 is reporting metrics.

TABLE 2

| CSI Report Number | CSI Fields |
| --- | --- |
| CSI Report N | CRI or SSBRI #1 |
| | CRI or SSBRI #2 |
| | CRI or SSBRI #3 |
| | Long CRI or Long SSBRI #4 |
| | SINR #1 |
| | Differential SINR #2 |
| | Different SINR #3 |
| | Differential SINR #4 |

In some examples, as shown in Table 2, the UE 215 may generate the L1 report 225 such that the L1 report 225 includes metrics for beams of the serving cell of the UE 215 and beam-level metric for at least one beam of a non-serving cell of the ULE 215. The L1 report 225 may include an indicator of a CSI report number N associated with the L1 report, as well as CSI fields for reporting metrics of different beams or cells. The report may include an identifier (e.g., a CSI reference signal (CSI-RS) resource indicator (CRI)) for beams (e.g., for three beams as in the example of Table 2) of the serving cell of the UE 215 and a long or joint index (e.g., including a beam index and an index or identifier of a non-serving cell) of a beam of a non-serving cell of the UE 215 for which the UE 215 is reporting metrics. Accordingly, the L1 report 225 may include an absolute metric for one beam of the serving cell and a differential metric for the other beams of the serving cell and for the beam of the non-serving cell. In some examples, the differential metric for the beam of the non-serving cell may be positive or negative or may include a different number of bits than the differential metric of the beams of the serving cell. In some implementations, the location, in the L1 report 225, of a metric associated with a beam which is identified using along or joint index may be fixed regardless of a value of the metric relative to other beams for which the UE 215 is reporting metrics.

The UE 215 may transmit the L1 report 225 to the base station 205 via the communication link 220. Accordingly, the base station 205 may use the L1 report 225 to determine whether to indicate the UE 215 to perform a beam switching procedure. Implementing aspects of the wireless communication system 200 may enable fast switching between beams of different cells which may lead to an increased reliability, an reduced resource utilization, or an increased efficiency, among other benefits.

Figure 3:
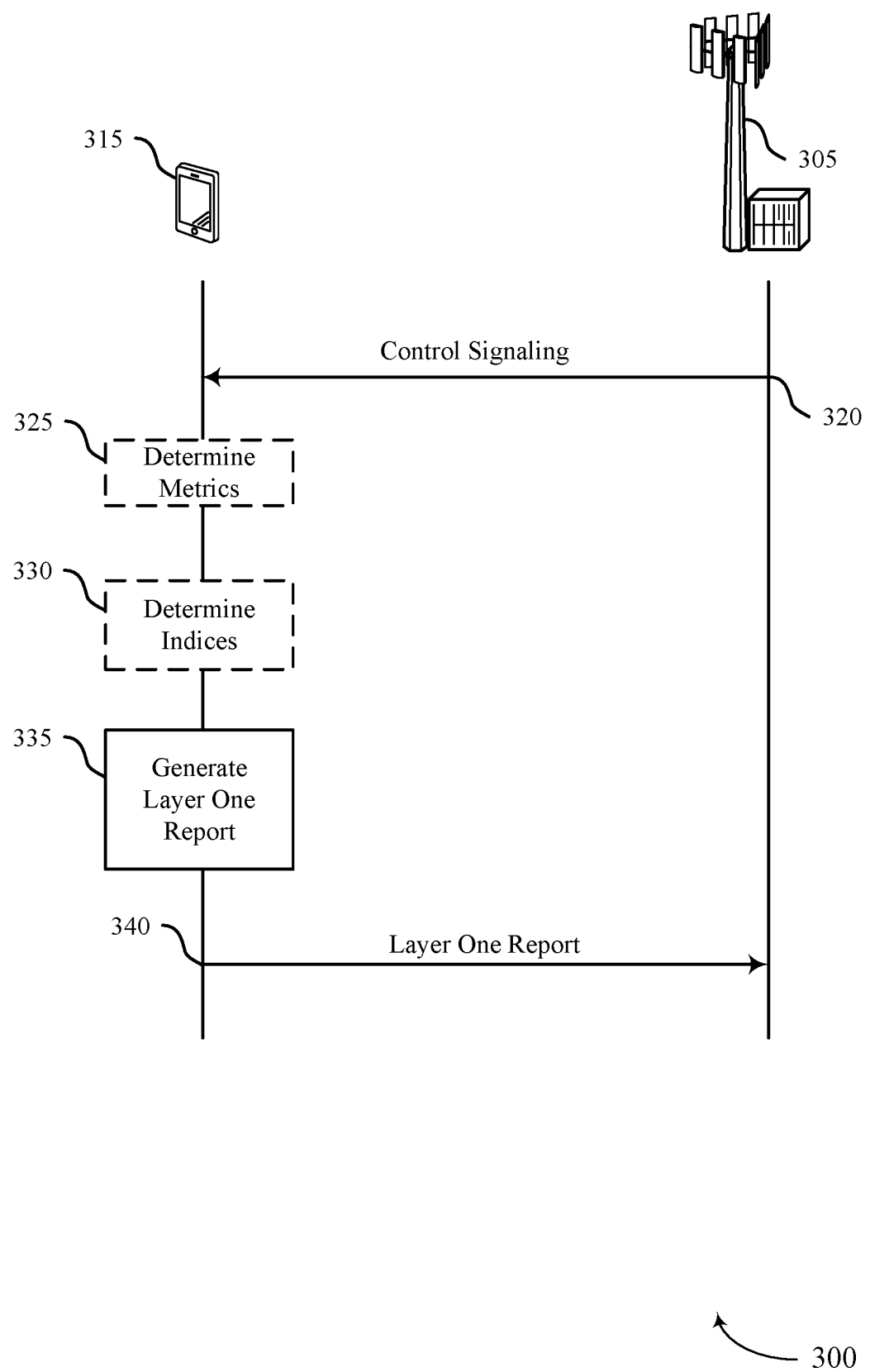
FIG. 3 illustrates an example of a process flow in a system that supports techniques for layer one reporting in wireless communications systems in accordance with aspects of the present disclosure.

FIG. 3 illustrates an example of a process flow 300 in a wireless communications system that supports techniques for L1 reporting in wireless communications systems, in accordance with various aspects of the present disclosure. In some examples, the process flow 300 may be implemented in accordance with one or more aspects of a wireless communications system 100 or 200 as described with reference to FIGS. 1 and 2. The process flow 300 may include a UE 315 and a base station 305 which may be examples of the corresponding devices described herein. Alternative examples of the following may be implemented in which some processes are performed in a different order than described or are not performed at all. In some examples, the processes may include additional features not mentioned below, or further processes may be added.

At 320, the base station 305 may transmit control signaling to the UE 315 indicating a configuration for the UE 315 to transmit a L1 report for beams of a serving cell of the UE 315 and for at least one non-serving cell of the UE 315. For example, the base station 305 may indicate the UE 315 to report metrics (e.g., RSRP or SINRS) for a number of beams of the serving cell, a cell-level metric for at least one non-serving cell, a number of beams of at least the one non-serving cell, or a combination thereof. In some examples, the base station 305 may determine the configuration such that the base station 305 is able to identify a location of each metric in the L1 report.

In some examples, at 325 and in response to receiving the control signaling, the UE 315 may determine a metric for a set of beams of the serving cell, at least one non-serving cell, or a set of beams of at least the one non-serving cell based on the configuration indicated by the base station 305. For example, the UE 315 may measure or otherwise determine a RSRP or SINR for each beam of a serving cell, each beam of a non-serving cell, or for the non-serving cell at a cell level. In some examples, the UE 315 may determine an aggregate value of the metric for a set of beams of the non-serving cell such that the cell-level metric includes the aggregate value.

In some examples, at 330, the UE 315 may determine an index of a non-serving cell or beams for which the UE 315 is to report metrics. For examples, the UE 315 may identify a physical cell identifier of the non-serving cell or an index of the non-serving cell relative to a set of cells configured for the UE 315 (e.g., by higher layer signaling or a layer three (L3) measurement report). In some implementations, the UE 315 may use long or joint indices to identify beams of non-serving cells. For example, the UE 315 may determine a beam index an a cell index or identifier and concatenate or otherwise combine the indices to obtain the long or joint index. Accordingly, the UE 315 may include the index in the L1 report to identify the beam for which the UE 315 is reporting metrics.

At 335, the UE 315 may generate the L1 report in accordance with the configuration received from the base station 305. The UE 315 may report absolute or differential metrics (e.g., RSRP or SINR) for non-serving cells or beams thereof as well as associated indices to identify the non-serving cells or the beams. In some examples, if the UE 315 uses a long or joint index, a differential metric may be negative or positive. Similarly, a number of bits used to report the differential metric may be different for different beams or non-serving cells. The UE 315 may also report metrics for beams of the serving cell.

At 340, the UE 315 may transmit, and the base station 305 may receive, the L1 report for the beams of the serving cell and for the non-serving cell of the UE 315. Implementing aspects of the present disclosure may enable fast switching between beams of multiple cells which may lead to an increased efficiency, a reduced resource utilization, or an increased reliability of communications, among other benefits.

Figure 4:
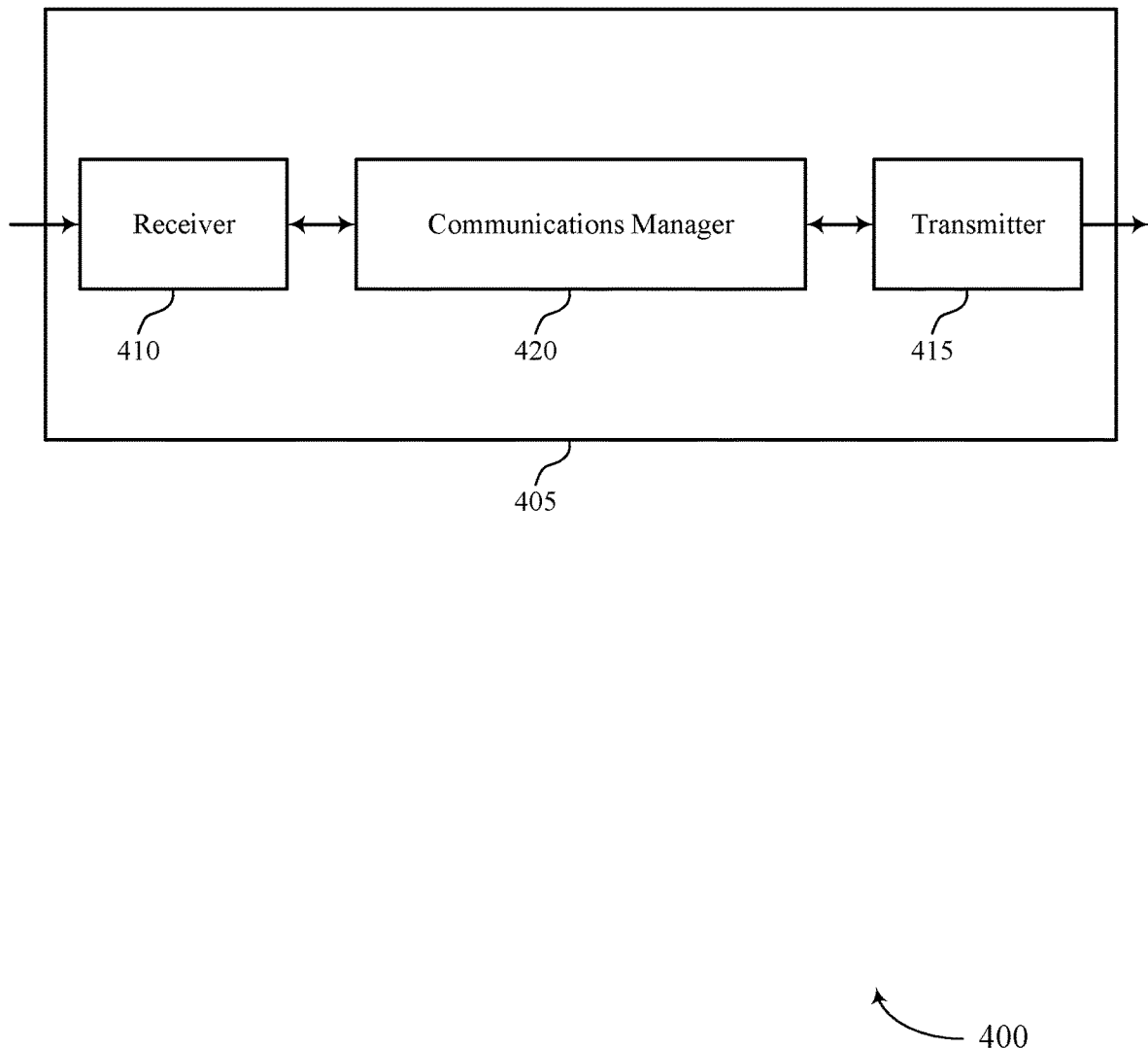
FIGS. 4 and 5 show block diagrams of devices that support techniques for layer one reporting in wireless communications systems in accordance with aspects of the present disclosure.

FIG. 4 shows a block diagram 400 of a device 405 that supports techniques for L1 reporting in wireless communications systems in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for L1 reporting in wireless communications systems). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for L1 reporting in wireless communications systems). In some examples, the transmitter 415 may be co-located with a receiver 410 in a transceiver component. The transmitter 415 may utilize a single antenna or a set of multiple antennas.

The communications manager 420, the receiver 410, the transmitter 415, or various combinations thereof or various components thereof may be examples of means for performing various aspects of techniques for L1 reporting in wireless communications systems as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for receiving control signaling from a base station, the control signaling indicating a configuration for transmitting, from the UE, a L1 report associated with a set of beams of a serving cell of the UE and with a non-serving cell of the UE. The communications manager 420 may be configured as or otherwise support a means for generating the L1 report based on the configuration, the L1 report based on a metric associated with the set of beams of the serving cell of the UE and with the non-serving cell of the UE. The communications manager 420 may be configured as or otherwise support a means for transmitting the generated L1 report to the base station.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for L1 reporting on non-serving cells in wireless communications systems such that the device 405 may exhibit an increased reliability, an increased efficiency, a reduced resource utilization, or a reduced power consumption, among other benefits.

Figure 5:
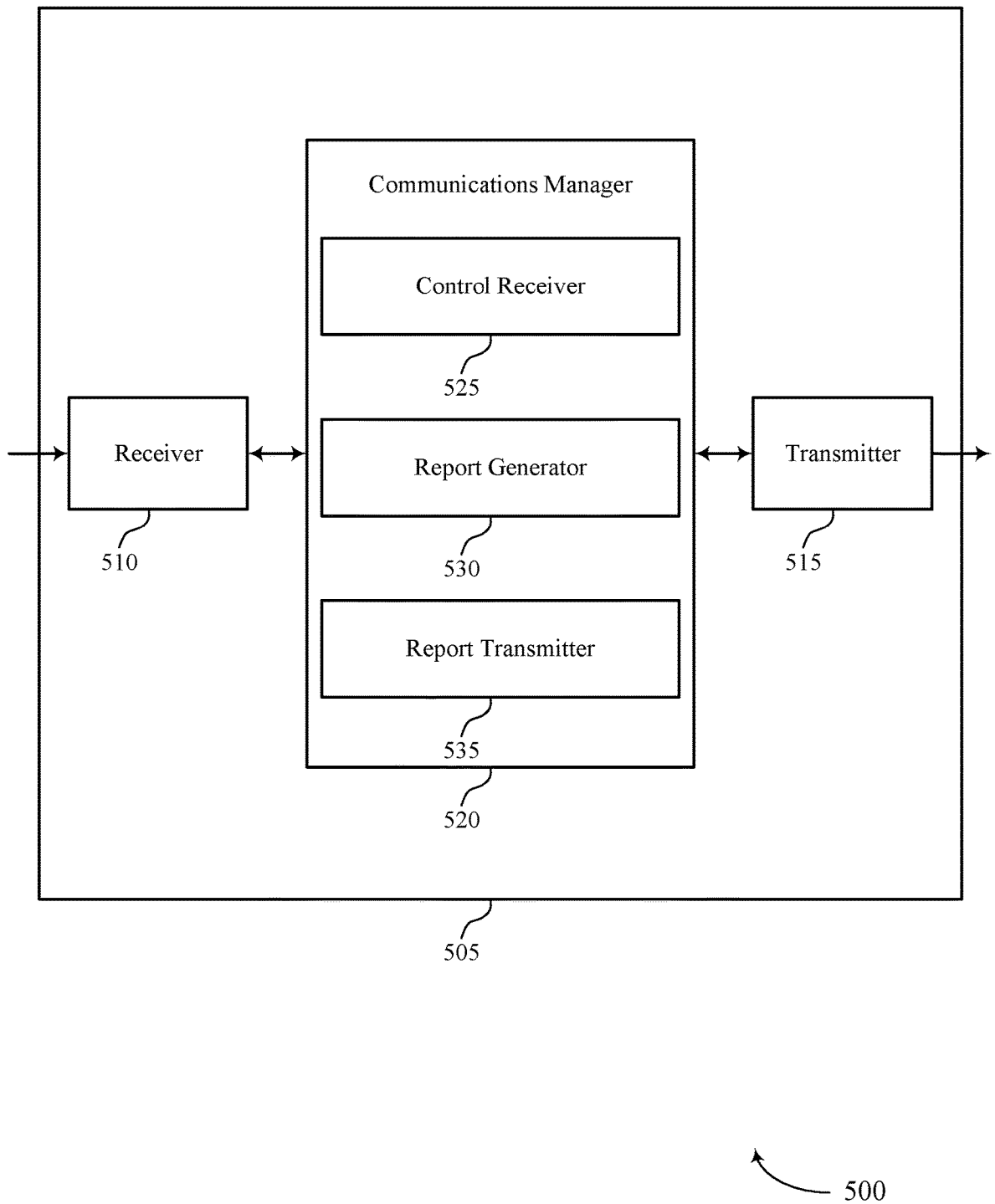

FIG. 5 shows a block diagram 500 of a device 505 that supports techniques for L1 reporting in wireless communications systems in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for L1 reporting in wireless communications systems). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for L1 reporting in wireless communications systems). In some examples, the transmitter 515 may be co-located with a receiver 510 in a transceiver component. The transmitter 515 may utilize a single antenna or a set of multiple antennas.

The device 505, or various components thereof, may be an example of means for performing various aspects of techniques for L1 reporting in wireless communications systems as described herein. For example, the communications manager 520 may include a control receiver 525, a report generator 530, a report transmitter 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The control receiver 525 may be configured as or otherwise support a means for receiving control signaling from a base station, the control signaling indicating a configuration for transmitting, from the UE, a L1 report associated with a set of beams of a serving cell of the UE and with a non-serving cell of the UE. The report generator 530 may be configured as or otherwise support a means for generating the L1 report based on the configuration, the L1 report based on a metric associated with the set of beams of the serving cell of the UE and with the non-serving cell of the UE. The report transmitter 535 may be configured as or otherwise support a means for transmitting the generated L1 report to the base station.

Figure 6:
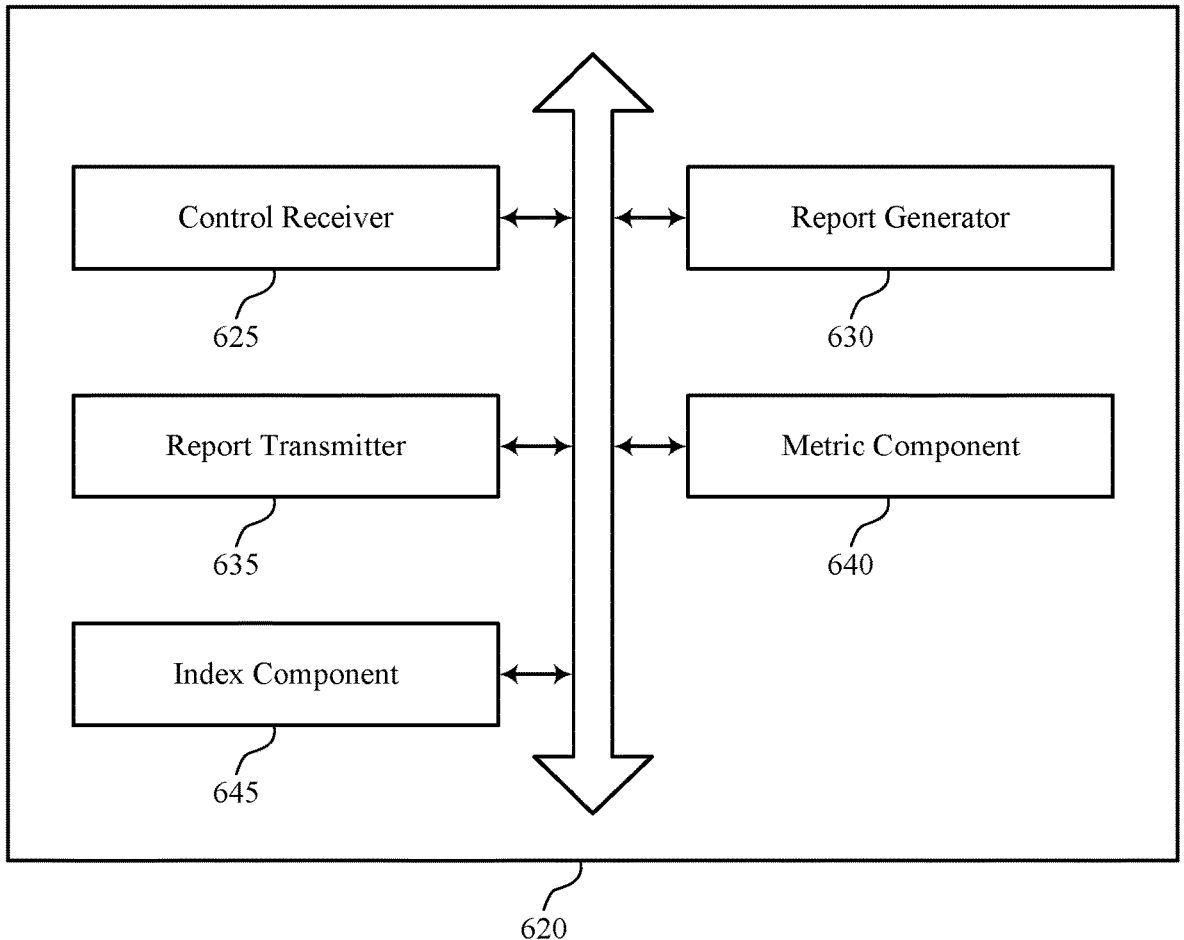
FIG. 6 shows a block diagram of a communications manager that supports techniques for layer one reporting in wireless communications systems in accordance with aspects of the present disclosure.

FIG. 6 shows a block diagram 600 of a communications manager 620 that supports techniques for L1 reporting in wireless communications systems in accordance with aspects of the present disclosure. The communications manager 620 may be an example of aspects of a communications manager 420, a communications manager 520, or both, as described herein. The communications manager 620, or various components thereof, may be an example of means for performing various aspects of techniques for L1 reporting in wireless communications systems as described herein. For example, the communications manager 620 may include a control receiver 625, a report generator 630, a report transmitter 635, a metric component 640, an index component 645, or any combination thereof. Each of these components may communicate, directly or indirectly, with one another (e.g., via one or more buses).

The communications manager 620 may support wireless communication at a UE in accordance with examples as disclosed herein. The control receiver 625 may be configured as or otherwise support a means for receiving control signaling from a base station, the control signaling indicating a configuration for transmitting, from the UE, a L1 report associated with a set of beams of a serving cell of the UE and with a non-serving cell of the UE. The report generator 630 may be configured as or otherwise support a means for generating the L1 report based on the configuration, the L1 report based on a metric associated with the set of beams of the serving cell of the UE and with the non-serving cell of the UE. The report transmitter 635 may be configured as or otherwise support a means for transmitting the generated L1 report to the base station.

In some examples, the control receiver 625 may be configured as or otherwise support a means for receiving, from the base station, an indication of a number of beams of the serving cell and a number of beams of the non-serving cell, where the L1 report includes an indication of the metric for each of the number of beams of the set of beams of the serving cell and for each of the number of beams of the set of beams of the non-serving cell.

In some examples, the metric component 640 may be configured as or otherwise support a means for determining the metric for each beam of the set of beams of the serving cell of the UE and for the non-serving cell of the UE, where the L1 report includes an indication of the metric for a subset of the set of beams and for the non-serving cell of the UE.

In some examples, to support determining the metric for the non-serving cell of the UE, the metric component 640 may be configured as or otherwise support a means for determining the metric for each beam of a set of beams of the non-serving cell, where the L1 report includes an indication of the metric associated with a beam of the set of beams for which the metric is highest.

In some examples, to support determining the metric for the non-serving cell of the UE, the metric component 640 may be configured as or otherwise support a means for determining the metric for each beam of a set of beams of the non-serving cell, where the L1 report includes an indication of an aggregate value of the metric for each beam of the set of beams of the non-serving cell.

In some examples, the index component 645 may be configured as or otherwise support a means for determining an index of the non-serving cell and an index of a beam of the non-serving cell. In some examples, the index component 645 may be configured as or otherwise support a means for determining a joint index including the index of the non-serving cell and the index of the beam of the non-serving cell, where the L1 report includes the joint index.

In some examples, the index component 645 may be configured as or otherwise support a means for determining an index of the non-serving cell, where the L1 report includes the index.

In some examples, the index includes a physical cell identifier associated with the non-serving cell or an identifier of the non-serving cell relative to a set of cells configured for the UE. In some examples, the metric includes a RSRP or a SINR.

Figure 7:
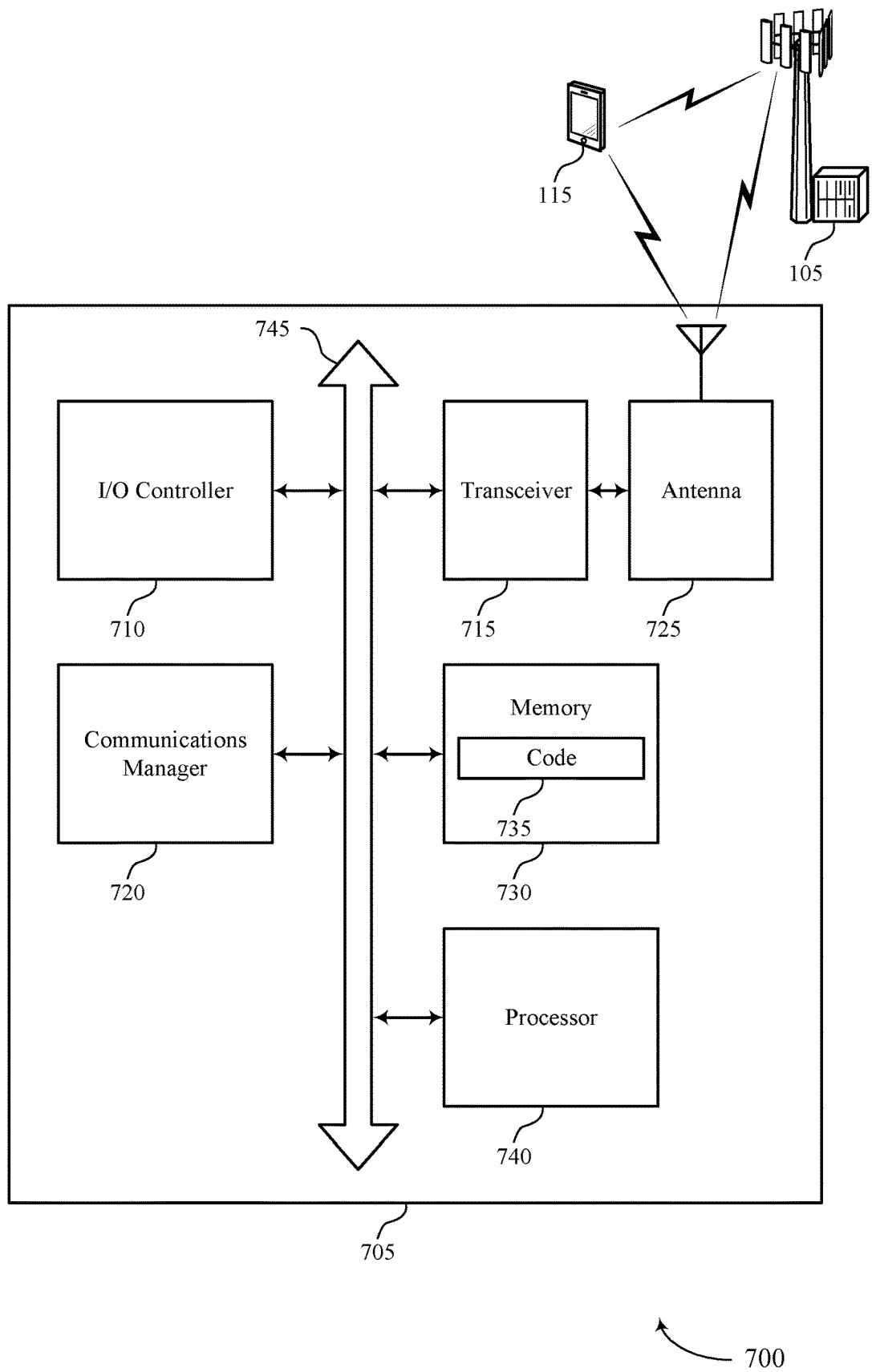
FIG. 7 shows a diagram of a system including a device that supports techniques for layer one reporting in wireless communications systems in accordance with aspects of the present disclosure.

FIG. 7 shows a diagram of a system 700 including a device 705 that supports techniques for L1 reporting in wireless communications systems in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for L1 reporting in wireless communications systems). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for receiving control signaling from a base station, the control signaling indicating a configuration for transmitting, from the UE, a L1 report associated with a set of beams of a serving cell of the UE and with a non-serving cell of the UE. The communications manager 720 may be configured as or otherwise support a means for generating the L1 report based on the configuration, the L1 report based on a metric associated with the set of beams of the serving cell of the UE and with the non-serving cell of the UE. The communications manager 720 may be configured as or otherwise support a means for transmitting the generated L1 report to the base station.

By including or configuring the communications manager 720 in accordance with examples as described herein, the device 705 may support techniques for L1 reporting on non-serving cells in wireless communications systems such that the device 705 may exhibit an increased reliability, an increased efficiency, a reduced resource utilization, or a reduced power consumption, among other benefits.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for L1 reporting in wireless communications systems as described herein, or the processor 740 and the memory 730 may be otherwise configured to perform or support such operations.

Figure 8:
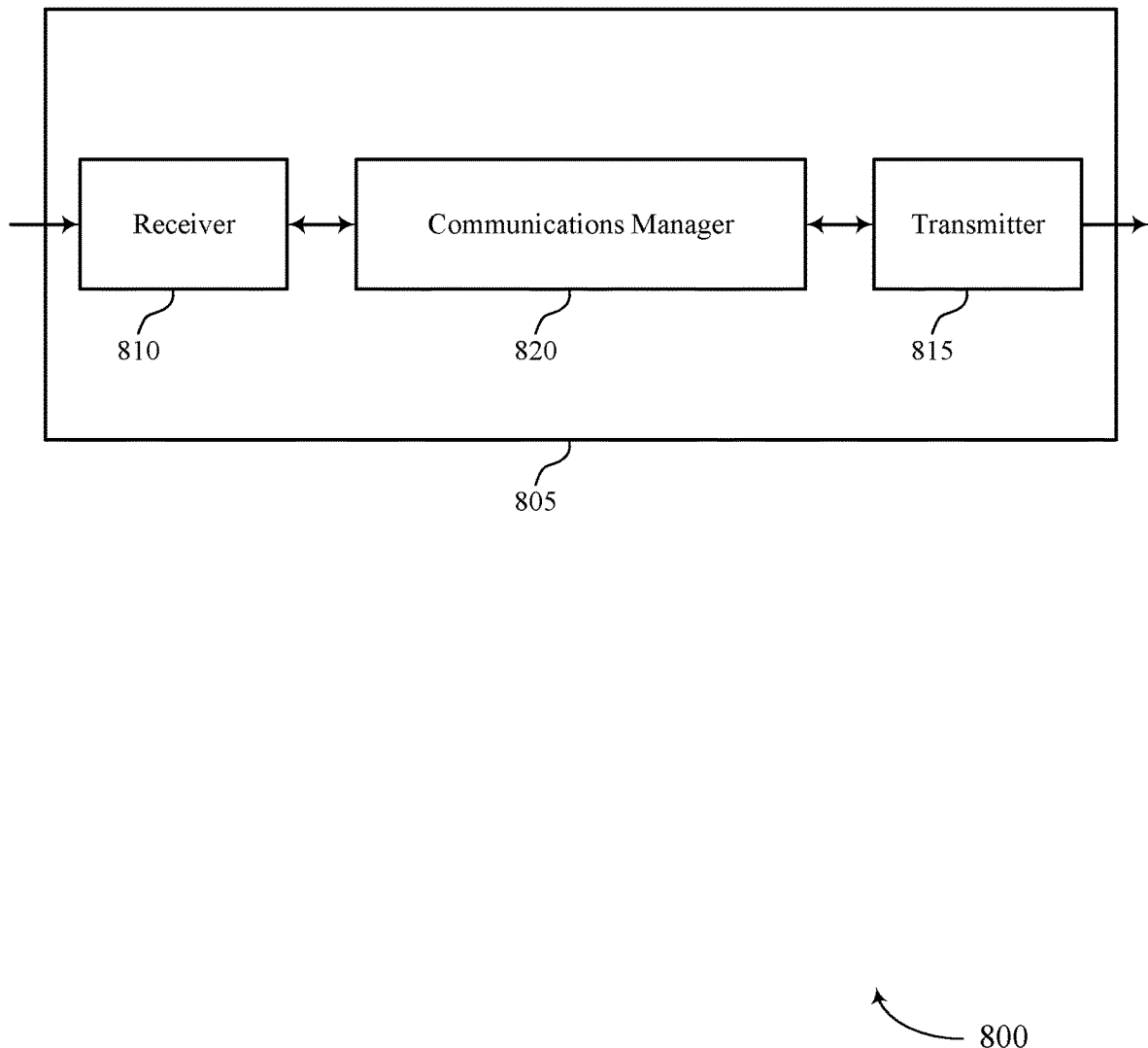
FIGS. 8 and 9 show block diagrams of devices that support techniques for layer one reporting in wireless communications systems in accordance with aspects of the present disclosure.

FIG. 8 shows a block diagram 800 of a device 805 that supports techniques for L1 reporting in wireless communications systems in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for L1 reporting in wireless communications systems). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for L1 reporting in wireless communications systems). In some examples, the transmitter 815 may be co-located with a receiver 810 in a transceiver component. The transmitter 815 may utilize a single antenna or a set of multiple antennas.

The communications manager 820, the receiver 810, the transmitter 815, or various combinations thereof or various components thereof may be examples of means for performing various aspects of techniques for L1 reporting in wireless communications systems as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a base station in accordance with examples as disclosed herein. For example, the communications manager 820 may be configured as or otherwise support a means for transmitting control signaling to a UE, the control signaling indicating a configuration for the UE to transmit a L1 report associated with a set of beams of a serving cell of the UE and associated with a non-serving cell of the UE. The communications manager 820 may be configured as or otherwise support a means for receiving the L1 report from the UE in response to transmitting the control signaling.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for L1 reporting on non-serving cells in wireless communications systems such that the device 805 may exhibit an increased reliability, an increased efficiency, a reduced resource utilization, or a reduced power consumption, among other benefits.

Figure 9:
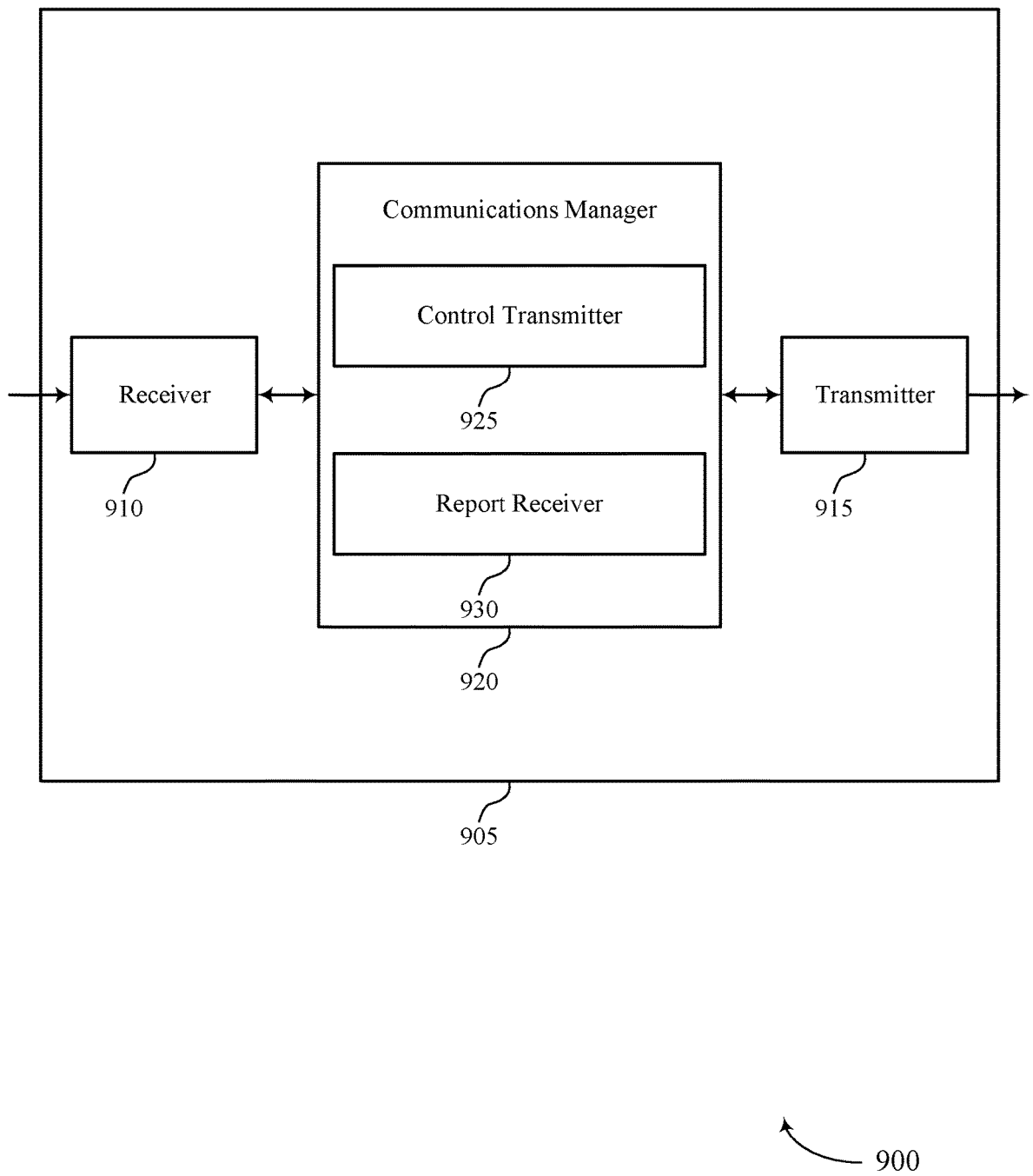

FIG. 9 shows a block diagram 900 of a device 905 that supports techniques for L1 reporting in wireless communications systems in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for L1 reporting in wireless communications systems). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for L1 reporting in wireless communications systems). In some examples, the transmitter 915 may be co-located with a receiver 910 in a transceiver component. The transmitter 915 may utilize a single antenna or a set of multiple antennas.

The device 905, or various components thereof, may be an example of means for performing various aspects of techniques for L1 reporting in wireless communications systems as described herein. For example, the communications manager 920 may include a control transmitter 925 a report receiver 930, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. The control transmitter 925 may be configured as or otherwise support a means for transmitting control signaling to a UE, the control signaling indicating a configuration for the UE to transmit a L1 report associated with a set of beams of a serving cell of the UE and associated with a non-serving cell of the UE. The report receiver 930 may be configured as or otherwise support a means for receiving the L1 report from the UE in response to transmitting the control signaling.

Figure 10:
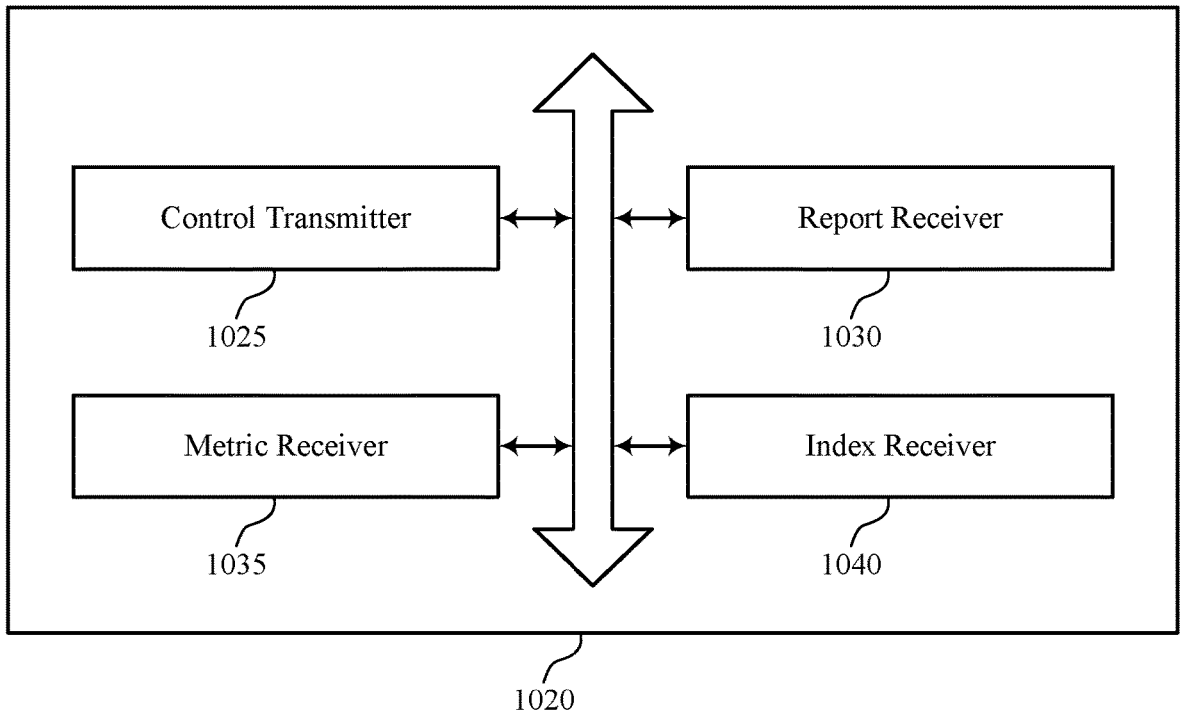
FIG. 10 shows a block diagram of a communications manager that supports techniques for layer one reporting in wireless communications systems in accordance with aspects of the present disclosure.

FIG. 10 shows a block diagram 1000 of a communications manager 1020 that supports techniques for L1 reporting in wireless communications systems in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for L1 reporting in wireless communications systems as described herein. For example, the communications manager 1020 may include a control transmitter 1025, a report receiver 1030, a metric receiver 1035, an index receiver 1040, or any combination thereof. Each of these components may communicate, directly or indirectly, with one another (e.g., via one or more buses).

The communications manager 1020 may support wireless communication at a base station in accordance with examples as disclosed herein. The control transmitter 1025 may be configured as or otherwise support a means for transmitting control signaling to a UE, the control signaling indicating a configuration for the UE to transmit a L1 report associated with a set of beams of a serving cell of the UE and associated with a non-serving cell of the UE. The report receiver 1030 may be configured as or otherwise support a means for receiving the L1 report from the UE in response to transmitting the control signaling.

In some examples, the control transmitter 1025 may be configured as or otherwise support a means for transmitting, to the UE, an indication of a number of beams of the serving cell and a number of beams of the non-serving cell, where the L1 report includes an indication of the metric for each of the number of beams of the serving cell and for each of the number of beams of the non-serving cell.

In some examples, the metric receiver 1035 may be configured as or otherwise support a means for receiving an indication of a metric for a subset of the set of beams of the serving cell and for the non-serving cell of the UE, where the L1 report includes the indication.

In some examples, the metric receiver 1035 may be configured as or otherwise support a means for receiving an indication of the metric for a beam of the non-serving cell for which the metric is highest, where the L1 report includes the indication.

In some examples, the metric receiver 1035 may be configured as or otherwise support a means for receiving an indication of an aggregate value of the metric for a set of beams of the non-serving cell, where the L1 report includes the indication. In some examples, the metric includes a RSRP or a SINR.

In some examples, the index receiver 1040 may be configured as or otherwise support a means for receiving a joint index including an index of the non-serving cell and an index of beam of the non-serving cell, where the L1 report includes the joint index.

In some examples, the index receiver 1040 may be configured as or otherwise support a means for receiving an index of the non-serving cell, where the L1 report includes the index.

In some examples, the index includes a physical cell identifier of the non-serving cell or an identifier of the non-serving cell relative to a set of cells configured for the UE.

Figure 11:
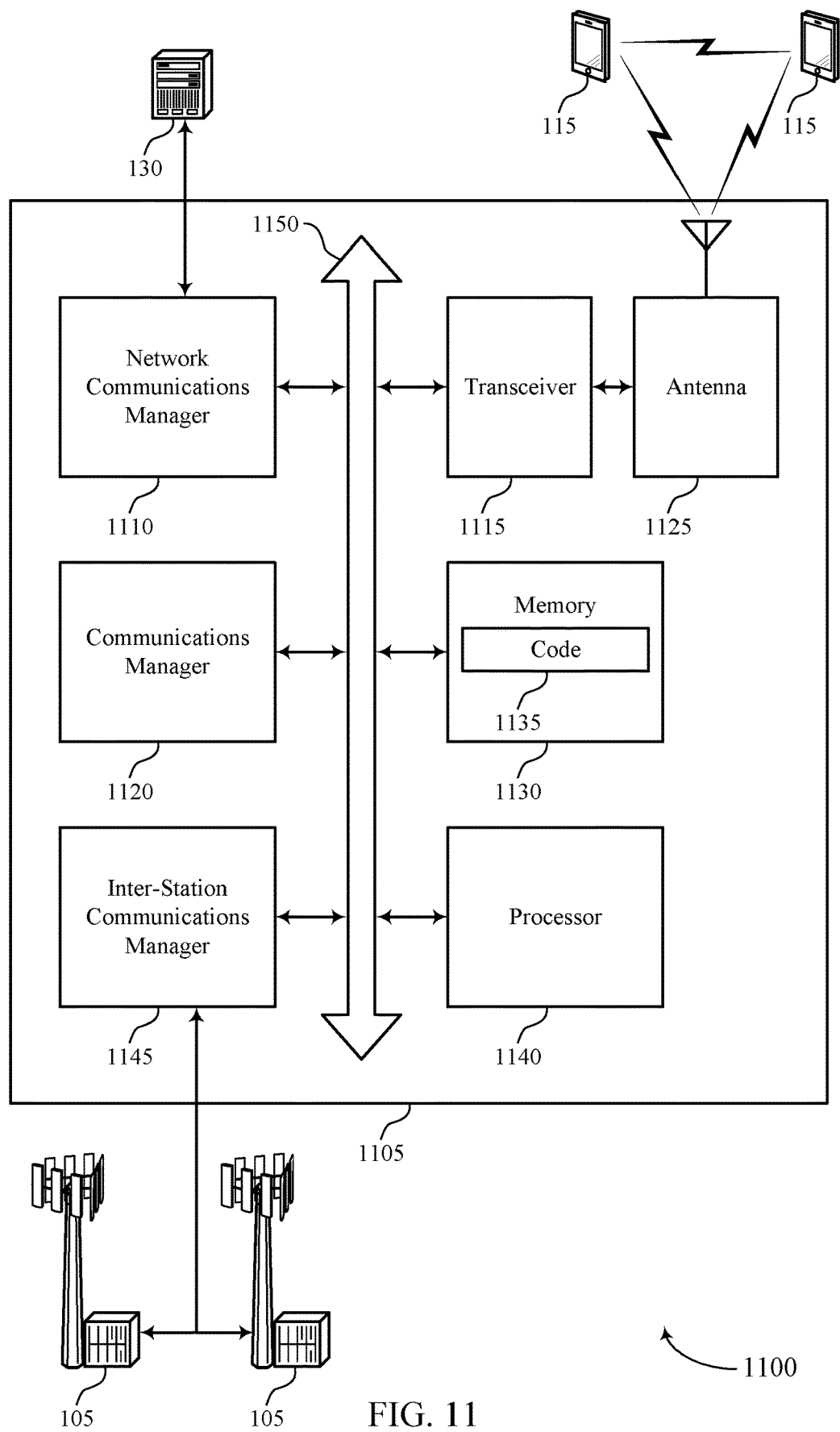
FIG. 11 shows a diagram of a system including a device that supports techniques for layer one reporting in wireless communications systems in accordance with aspects of the present disclosure.

FIG. 11 shows a diagram of a system 1100 including a device 1105 that supports techniques for L1 reporting in wireless communications systems in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for L1 reporting in wireless communications systems). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a base station in accordance with examples as disclosed herein. For example, the communications manager 1120 may be configured as or otherwise support a means for transmitting control signaling to a UE, the control signaling indicating a configuration for the UE to transmit a L1 report associated with a set of beams of a serving cell of the UE and associated with a non-serving cell of the UE. The communications manager 1120 may be configured as or otherwise support a means for receiving the L1 report from the UE in response to transmitting the control signaling.

By including or configuring the communications manager 1120 in accordance with examples as described herein, the device 1105 may support techniques for L1 reporting on non-serving cells in wireless communications systems such that the device 1105 may exhibit an increased reliability, an increased efficiency, a reduced resource utilization, or a reduced power consumption, among other benefits.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for L1 reporting in wireless communications systems as described herein, or the processor 1140 and the memory 1130 may be otherwise configured to perform or support such operations.

Figure 12:
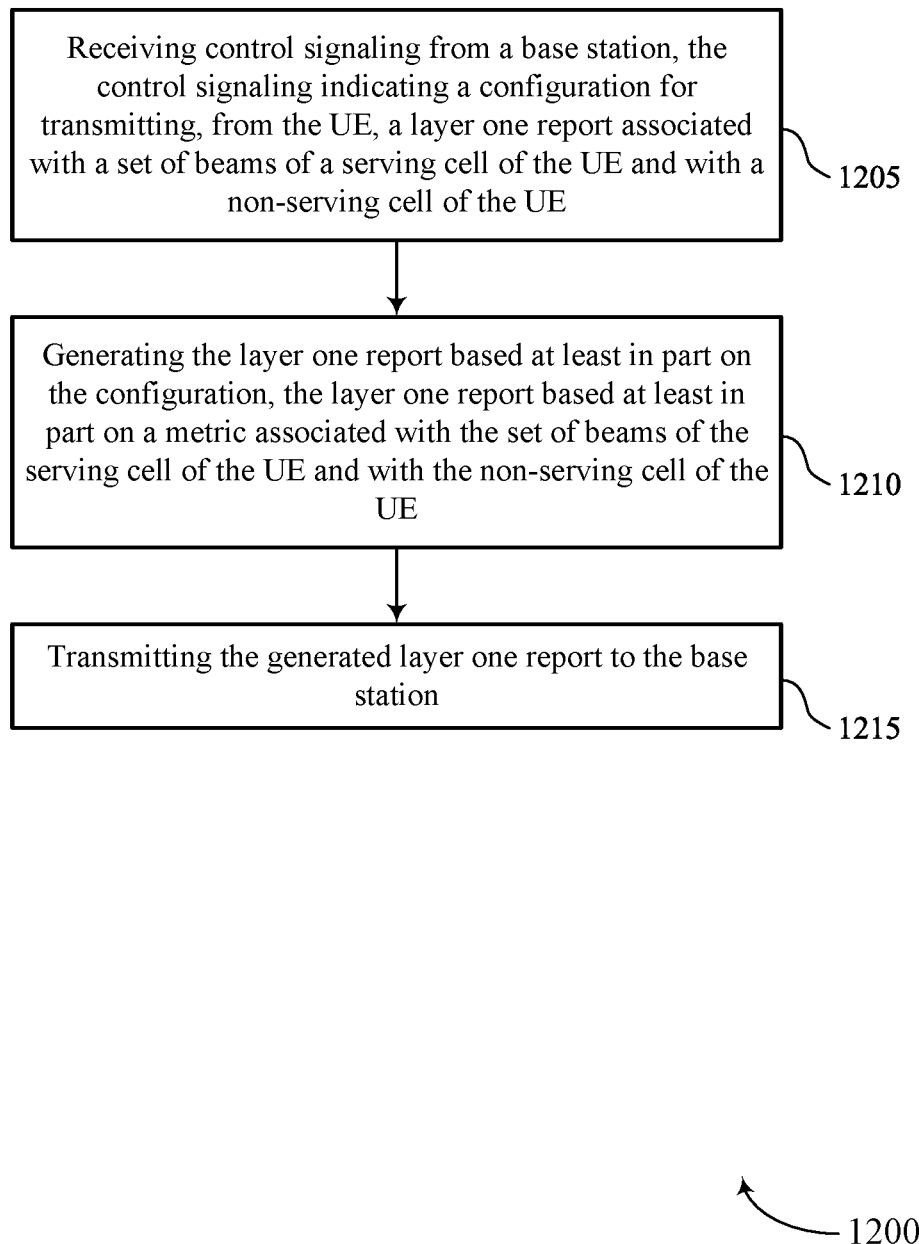
FIGS. 12 through 19 show flowcharts illustrating methods that support techniques for layer one reporting in wireless communications systems in accordance with aspects of the present disclosure.

FIG. 12 shows a flowchart illustrating a method 1200 that supports techniques for L1 reporting in wireless communications systems in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include receiving control signaling from a base station, the control signaling indicating a configuration for transmitting, from the UE, a L1 report associated with a set of beams of a serving cell of the UE and with a non-serving cell of the UE. The operations of 1205 may be performed in accordance with examples as disclosed herein. In some examples, aspects of the operations of 1205 may be performed by a control receiver 625 as described with reference to FIG. 6.

At 1210, the method may include generating the L1 report based on the configuration, the L1 report based on a metric associated with the set of beams of the serving cell of the UE and with the non-serving cell of the UE. The operations of 1210 may be performed in accordance with examples as disclosed herein. In some examples, aspects of the operations of 1210 may be performed by a report generator 630 as described with reference to FIG. 6.

At 1215, the method may include transmitting the generated L1 report to the base station. The operations of 1215 may be performed in accordance with examples as disclosed herein. In some examples, aspects of the operations of 1215 may be performed by a report transmitter 635 as described with reference to FIG. 6.

Figure 13:
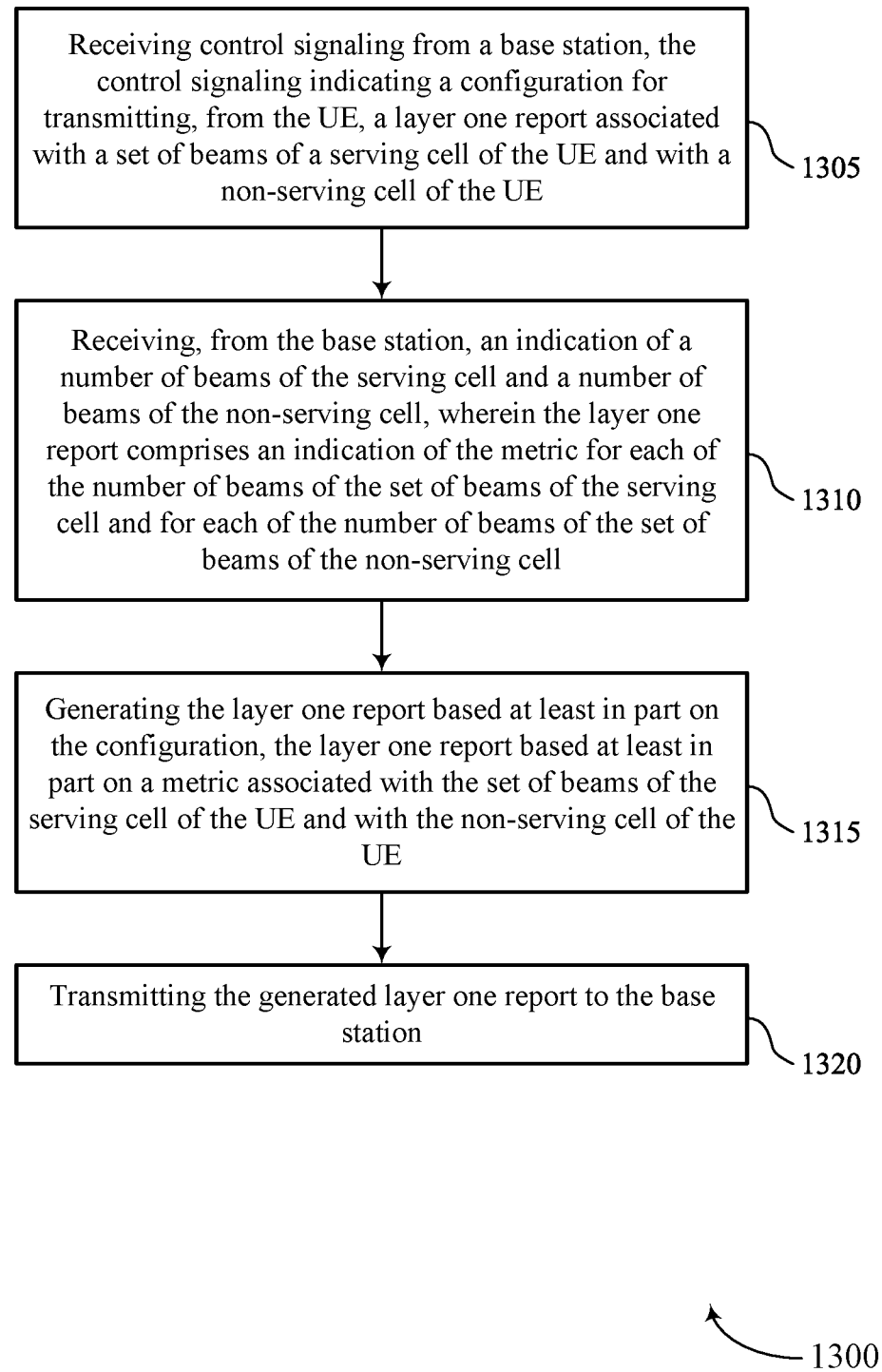

FIG. 13 shows a flowchart illustrating a method 1300 that supports techniques for L1 reporting in wireless communications systems in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include receiving control signaling from a base station, the control signaling indicating a configuration for transmitting, from the UE, a L1 report associated with a set of beams of a serving cell of the UE and with a non-serving cell of the UE. The operations of 1305 may be performed in accordance with examples as disclosed herein. In some examples, aspects of the operations of 1305 may be performed by a control receiver 625 as described with reference to FIG. 6.

At 1310, the method may include receiving, from the base station, an indication of a number of beams of the serving cell and a number of beams of the non-serving cell, where the L1 report includes an indication of the metric for each of the number of beams of the set of beams of the serving cell and for each of the number of beams of the set of beams of the non-serving cell. The operations of 1310 may be performed in accordance with examples as disclosed herein. In some examples, aspects of the operations of 1310 may be performed by a control receiver 625 as described with reference to FIG. 6.

At 1315, the method may include generating the L1 report based on the configuration, the L1 report based on a metric associated with the set of beams of the serving cell of the UE and with the non-serving cell of the UE. The operations of 1315 may be performed in accordance with examples as disclosed herein. In some examples, aspects of the operations of 1315 may be performed by a report generator 630 as described with reference to FIG. 6.

At 1320, the method may include transmitting the generated L1 report to the base station. The operations of 1320 may be performed in accordance with examples as disclosed herein. In some examples, aspects of the operations of 1320 may be performed by a report transmitter 635 as described with reference to FIG. 6.

Figure 14:
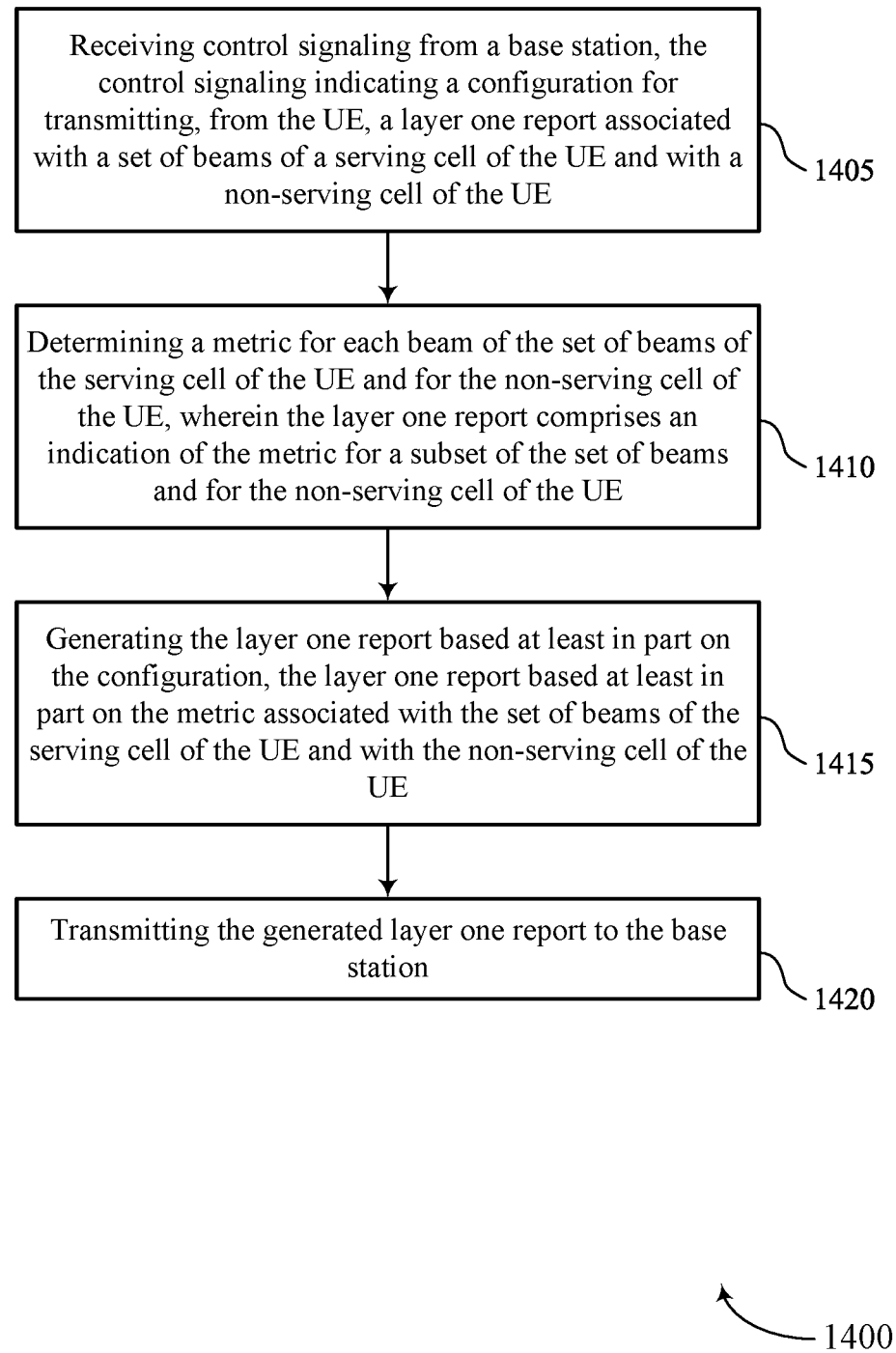

FIG. 14 shows a flowchart illustrating a method 1400 that supports techniques for L1 reporting in wireless communications systems in accordance with aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1405, the method may include receiving control signaling from a base station, the control signaling indicating a configuration for transmitting, from the UE, a L1 report associated with a set of beams of a serving cell of the UE and with a non-serving cell of the UE. The operations of 1405 may be performed in accordance with examples as disclosed herein. In some examples, aspects of the operations of 1405 may be performed by a control receiver 625 as described with reference to FIG. 6.

At 1410, the method may include determining a metric for each beam of the set of beams of the serving cell of the UE and for the non-serving cell of the UE, where the L1 report includes an indication of the metric for a subset of the set of beams and for the non-serving cell of the UE. The operations of 1410 may be performed in accordance with examples as disclosed herein. In some examples, aspects of the operations of 1410 may be performed by a metric component 640 as described with reference to FIG. 6.

At 1415, the method may include generating the L1 report based on the configuration, the L1 report based on the metric associated with the set of beams of the serving cell of the UE and with the non-serving cell of the UE. The operations of 1415 may be performed in accordance with examples as disclosed herein. In some examples, aspects of the operations of 1415 may be performed by a report generator 630 as described with reference to FIG. 6.

At 1420, the method may include transmitting the generated L1 report to the base station. The operations of 1420 may be performed in accordance with examples as disclosed herein. In some examples, aspects of the operations of 1420 may be performed by a report transmitter 635 as described with reference to FIG. 6.

Figure 15:
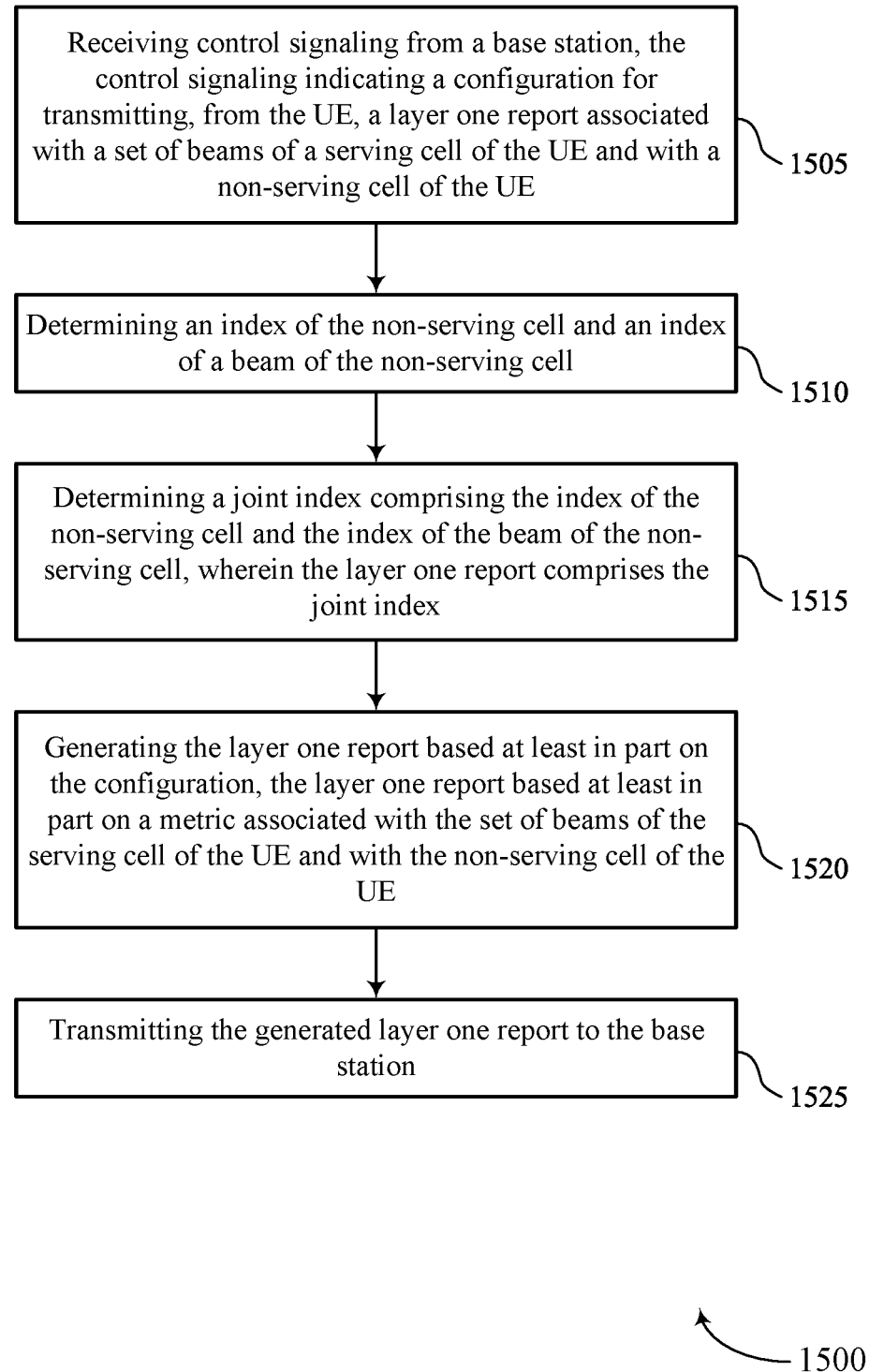

FIG. 15 shows a flowchart illustrating a method 1500 that supports techniques for L1 reporting in wireless communications systems in accordance with aspects of the present disclosure. The operations of the method 1500 may be implemented by a UE or its components as described herein. For example, the operations of the method 1500 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1505, the method may include receiving control signaling from a base station, the control signaling indicating a configuration for transmitting, from the UE, a L1 report associated with a set of beams of a serving cell of the UE and with a non-serving cell of the UE. The operations of 1505 may be performed in accordance with examples as disclosed herein. In some examples, aspects of the operations of 1505 may be performed by a control receiver 625 as described with reference to FIG. 6.

At 1510, the method may include determining an index of the non-serving cell and an index of a beam of the non-serving cell. The operations of 1510 may be performed in accordance with examples as disclosed herein. In some examples, aspects of the operations of 1510 may be performed by an index component 645 as described with reference to FIG. 6.

At 1515, the method may include determining a joint index including the index of the non-serving cell and the index of the beam of the non-serving cell, where the L1 report includes the joint index. The operations of 1515 may be performed in accordance with examples as disclosed herein. In some examples, aspects of the operations of 1515 may be performed by an index component 645 as described with reference to FIG. 6.

At 1520, the method may include generating the L1 report based on the configuration, the L1 report based on a metric associated with the set of beams of the serving cell of the UE and with the non-serving cell of the UE. The operations of 1520 may be performed in accordance with examples as disclosed herein. In some examples, aspects of the operations of 1520 may be performed by a report generator 630 as described with reference to FIG. 6.

At 1525, the method may include transmitting the generated L1 report to the base station. The operations of 1525 may be performed in accordance with examples as disclosed herein. In some examples, aspects of the operations of 1525 may be performed by a report transmitter 635 as described with reference to FIG. 6.

Figure 16:
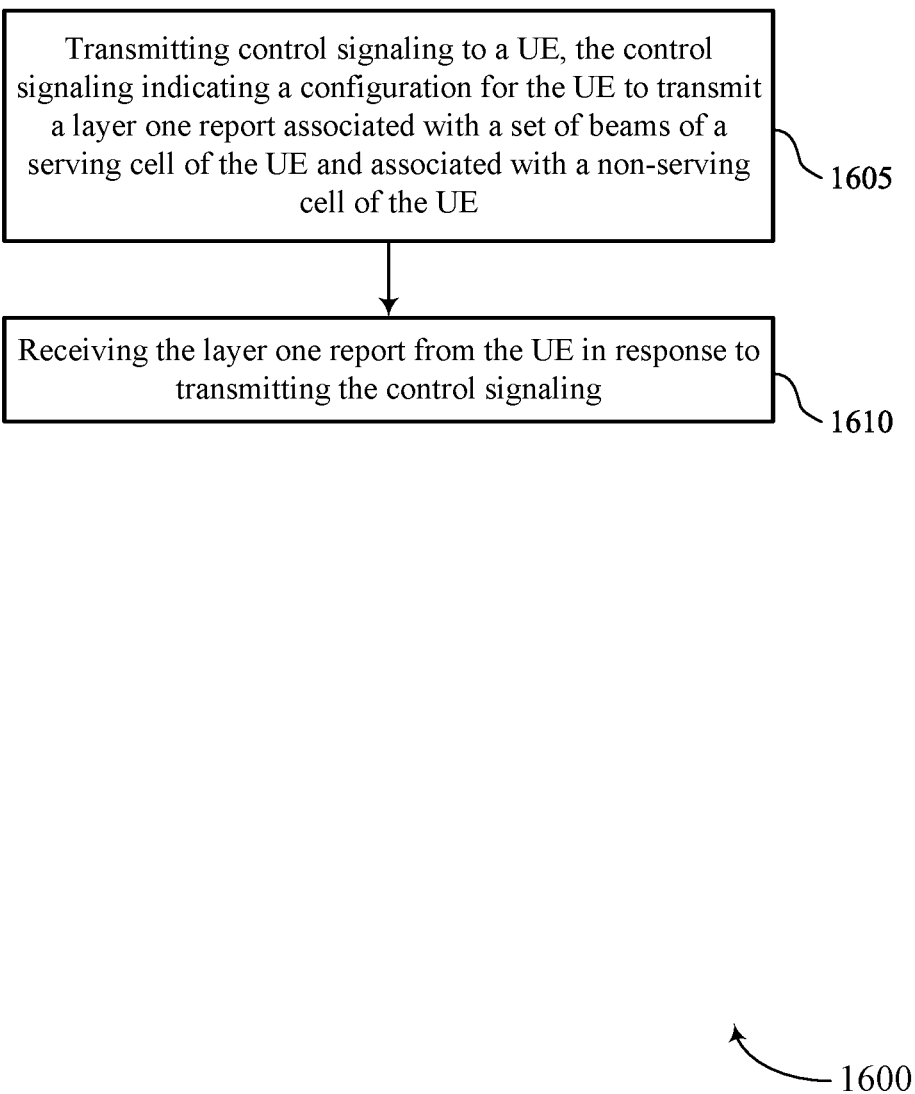

FIG. 16 shows a flowchart illustrating a method 1600 that supports techniques for L1 reporting in wireless communications systems in accordance with aspects of the present disclosure. The operations of the method 1600 may be implemented by a base station or its components as described herein. For example, the operations of the method 1600 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1605, the method may include transmitting control signaling to a UE, the control signaling indicating a configuration for the UE to transmit a L1 report associated with a set of beams of a serving cell of the UE and associated with a non-serving cell of the UE. The operations of 1605 may be performed in accordance with examples as disclosed herein. In some examples, aspects of the operations of 1605 may be performed by a control transmitter 1025 as described with reference to FIG. 10.

At 1610, the method may include receiving the L1 report from the UE in response to transmitting the control signaling. The operations of 1610 may be performed in accordance with examples as disclosed herein. In some examples, aspects of the operations of 1610 may be performed by a report receiver 1030 as described with reference to FIG. 10.

Figure 17:
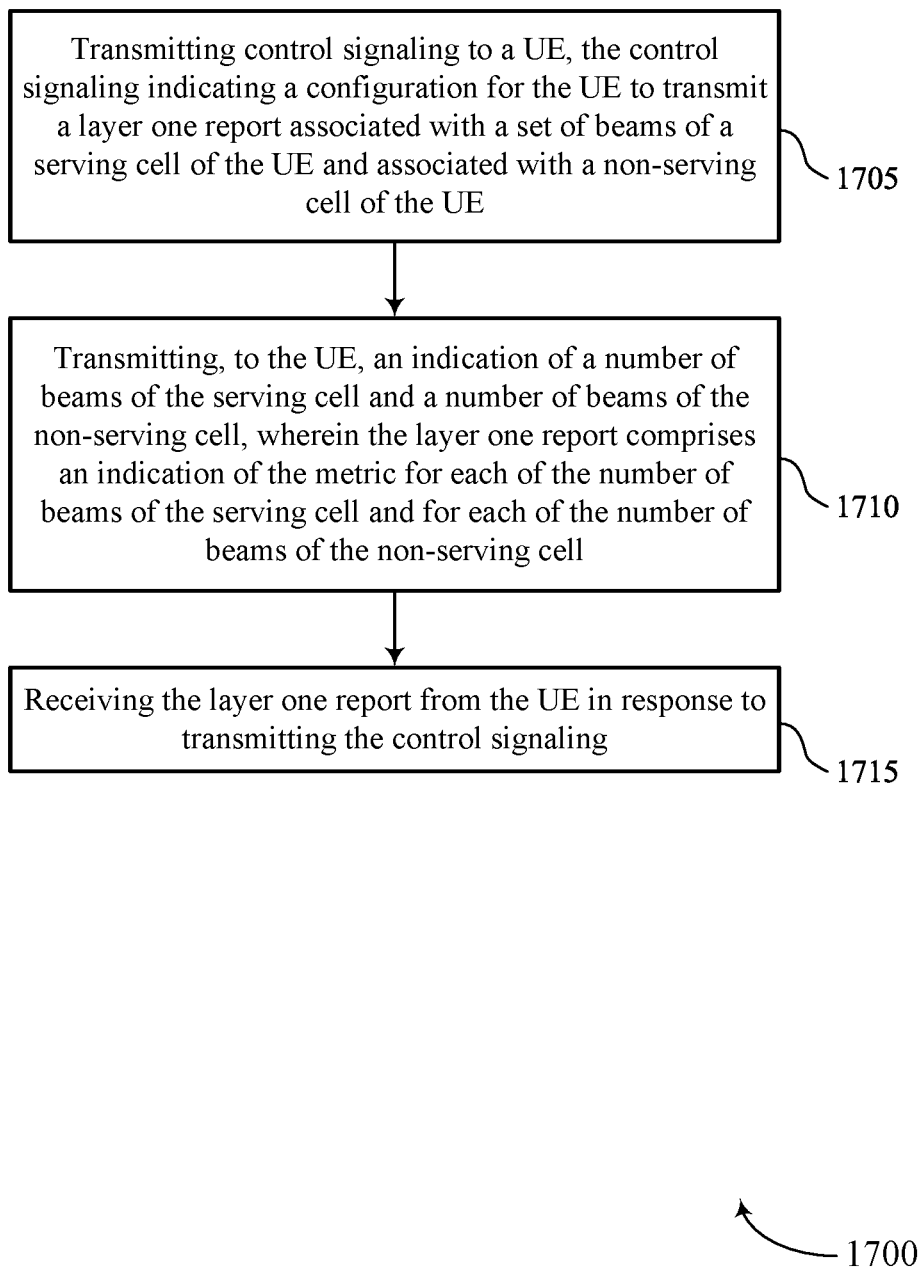

FIG. 17 shows a flowchart illustrating a method 1700 that supports techniques for L1 reporting in wireless communications systems in accordance with aspects of the present disclosure. The operations of the method 1700 may be implemented by a base station or its components as described herein. For example, the operations of the method 1700 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1705, the method may include transmitting control signaling to a UE, the control signaling indicating a configuration for the UE to transmit a L1 report associated with a set of beams of a serving cell of the UE and associated with a non-serving cell of the UE. The operations of 1705 may be performed in accordance with examples as disclosed herein. In some examples, aspects of the operations of 1705 may be performed by a control transmitter 1025 as described with reference to FIG. 10.

At 1710, the method may include transmitting, to the UE, an indication of a number of beams of the serving cell and a number of beams of the non-serving cell, where the L1 report includes an indication of the metric for each of the number of beams of the serving cell and for each of the number of beams of the non-serving cell. The operations of 1710 may be performed in accordance with examples as disclosed herein. In some examples, aspects of the operations of 1710 may be performed by a control transmitter 1025 as described with reference to FIG. 10.

At 1715, the method may include receiving the L1 report from the UE in response to transmitting the control signaling. The operations of 1715 may be performed in accordance with examples as disclosed herein. In some examples, aspects of the operations of 1715 may be performed by a report receiver 1030 as described with reference to FIG. 10.

Figure 18:
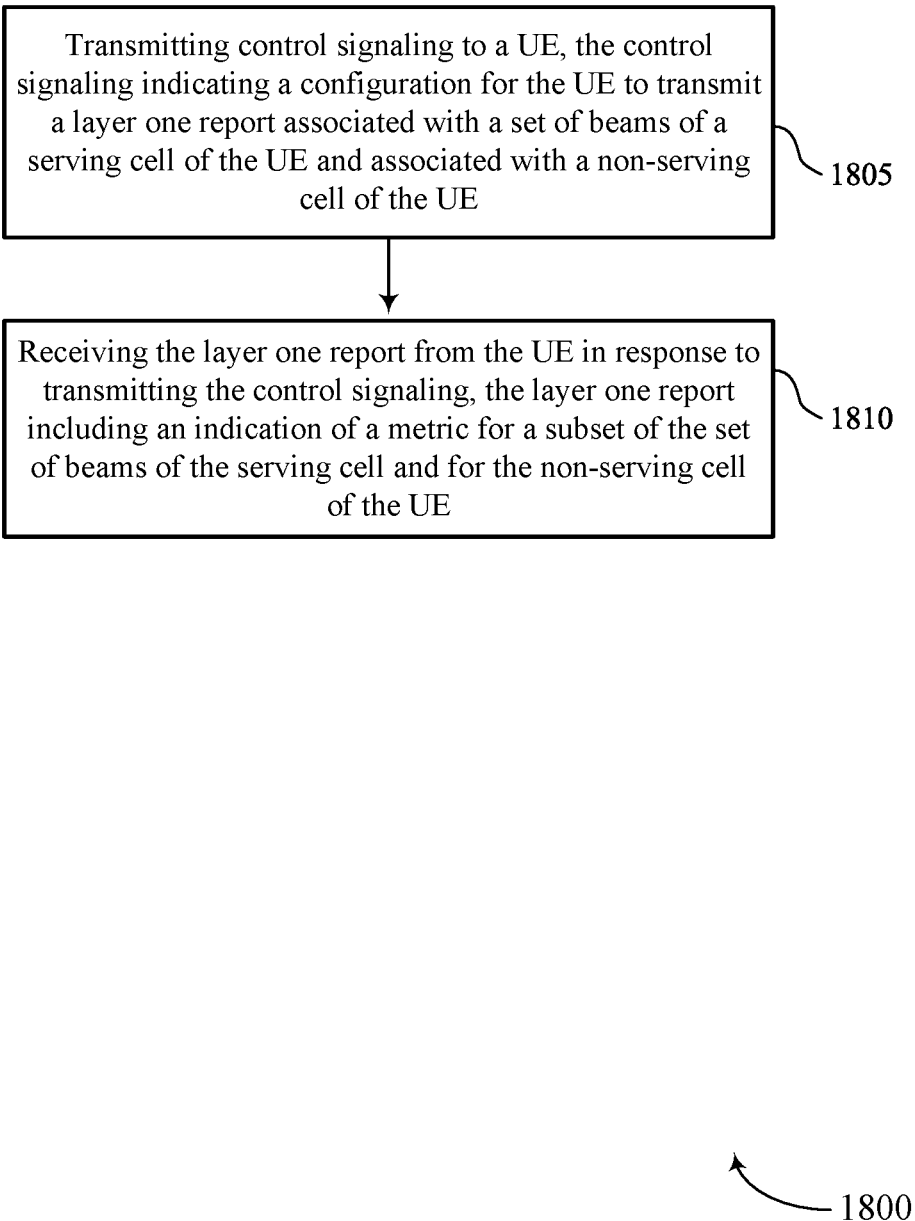

FIG. 18 shows a flowchart illustrating a method 1800 that supports techniques for L1 reporting in wireless communications systems in accordance with aspects of the present disclosure. The operations of the method 1800 may be implemented by a base station or its components as described herein. For example, the operations of the method 1800 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1805, the method may include transmitting control signaling to a UE, the control signaling indicating a configuration for the UE to transmit a L1 report associated with a set of beams of a serving cell of the UE and associated with a non-serving cell of the UE. The operations of 1805 may be performed in accordance with examples as disclosed herein. In some examples, aspects of the operations of 1805 may be performed by a control transmitter 1025 as described with reference to FIG. 10.

At 1810, the method may include receiving the L1 report from the UE in response to transmitting the control signaling, the L1 report including an indication of a metric for a subset of the set of beams of the serving cell and for the non-serving cell of the UE. The operations of 1810 may be performed in accordance with examples as disclosed herein. In some examples, aspects of the operations of 1810 may be performed by a report receiver 1030 as described with reference to FIG. 10.

Figure 19:
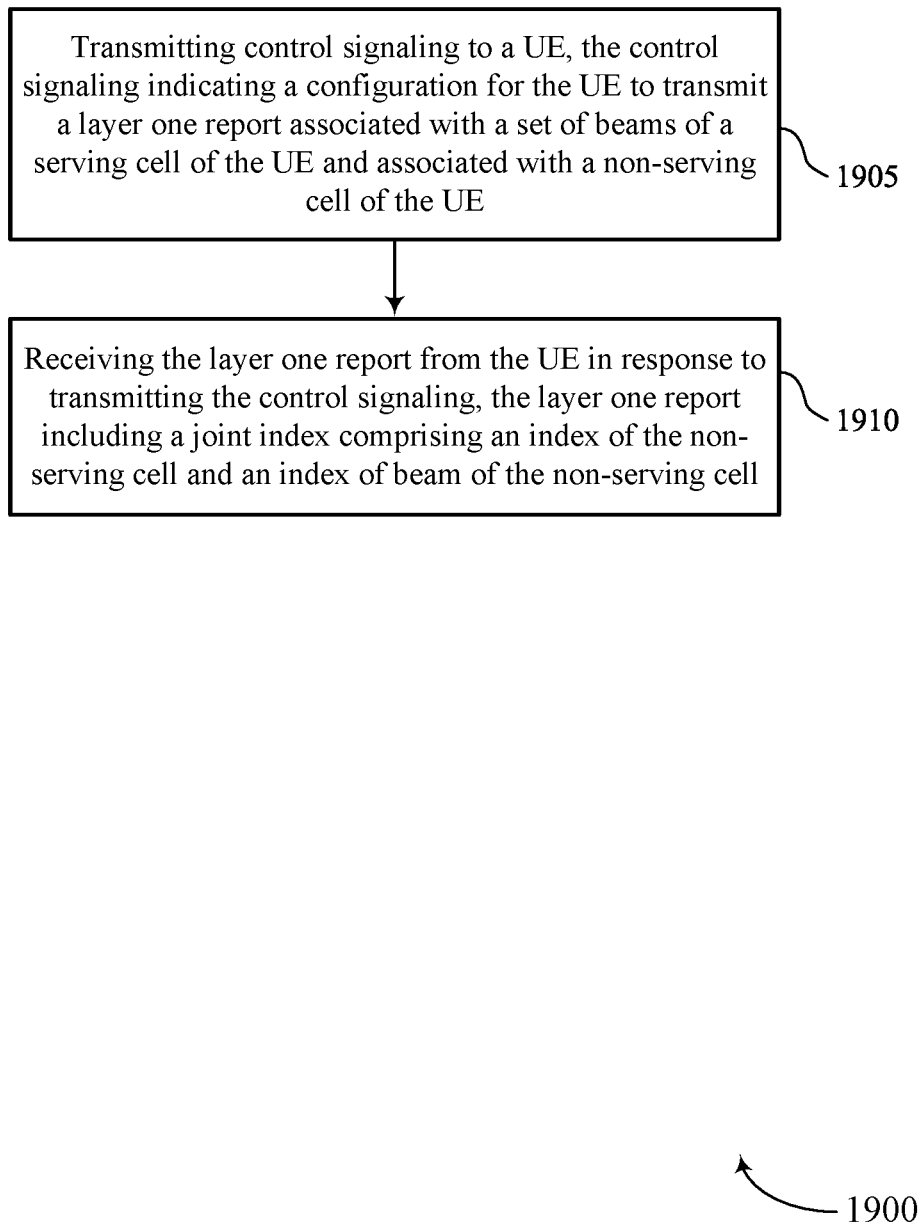

FIG. 19 shows a flowchart illustrating a method 1900 that supports techniques for L1 reporting in wireless communications systems in accordance with aspects of the present disclosure. The operations of the method 1900 may be implemented by a base station or its components as described herein. For example, the operations of the method 1900 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1905, the method may include transmitting control signaling to a UE, the control signaling indicating a configuration for the UE to transmit a L1 report associated with a set of beams of a serving cell of the UE and associated with a non-serving cell of the UE. The operations of 1905 may be performed in accordance with examples as disclosed herein. In some examples, aspects of the operations of 1905 may be performed by a control transmitter 1025 as described with reference to FIG. 10.

At 1910, the method may include receiving the L1 report from the UE in response to transmitting the control signaling, the L1 report including a joint index including an index of the non-serving cell and an index of beam of the non-serving cell. The operations of 1910 may be performed in accordance with examples as disclosed herein. In some examples, aspects of the operations of 1910 may be performed by a report receiver 1030 as described with reference to FIG. 10.

The following provides an overview of aspects of the present disclosure:

Aspect 1: A method for wireless communication at a UE, comprising: receiving control signaling from a base station, the control signaling indicating a configuration for transmitting, from the UE, a L1 report associated with a set of beams of a serving cell of the UE and with a non-serving cell of the UE; generating the L1 report based at least in part on the configuration, the L1 report based at least in part on a metric associated with the set of beams of the serving cell of the UE and with the non-serving cell of the UE; and transmitting the generated L1 report to the base station.

Aspect 2: The method of aspect 1, further comprising: receiving, from the base station, an indication of a number of beams of the serving cell and a number of beams of the non-serving cell, wherein the L1 report comprises an indication of the metric for each of the number of beams of the set of beams of the serving cell and for each of the number of beams of the set of beams of the non-serving cell.

Aspect 3: The method of any of aspects 1 through 2, further comprising: determining the metric for each beam of the set of beams of the serving cell of the UE and for the non-serving cell of the UE, wherein the L1 report comprises an indication of the metric for a subset of the set of beams and for the non-serving cell of the UE.

Aspect 4: The method of aspect 3, wherein determining the metric for the non-serving cell of the UE comprises: determining the metric for each beam of a set of beams of the non-serving cell, wherein the L1 report comprises an indication of the metric associated with a beam of the set of beams for which the metric is highest.

Aspect 5: The method of any of aspects 3 through 4, wherein determining the metric for the non-serving cell of the UE comprises: determining the metric for each beam of a set of beams of the non-serving cell, wherein the L1 report comprises an indication of an aggregate value of the metric for each beam of the set of beams of the non-serving cell.

Aspect 6: The method of any of aspects 1 through 5, further comprising: determining an index of the non-serving cell and an index of a beam of the non-serving cell; and determining a joint index comprising the index of the non-serving cell and the index of the beam of the non-serving cell, wherein the L1 report comprises the joint index.

Aspect 7: The method of any of aspects 1 through 6, further comprising: determining an index of the non-serving cell, wherein the L1 report comprises the index.

Aspect 8: The method of aspect 7, wherein the index comprises a physical cell identifier associated with the non-serving cell or an identifier of the non-serving cell relative to a set of cells configured for the UE.

Aspect 9: The method of any of aspects 1 through 8, wherein the metric comprises a RSRP or a SINR.

Aspect 10: A method for wireless communication at a base station, comprising: transmitting control signaling to a UE, the control signaling indicating a configuration for the UE to transmit a L1 report associated with a set of beams of a serving cell of the UE and associated with a non-serving cell of the UE; receiving the L1 report from the UE in response to transmitting the control signaling.

Aspect 11: The method of aspect 10, further comprising: transmitting, to the UE, an indication of a number of beams of the serving cell and a number of beams of the non-serving cell, wherein the L1 report comprises an indication of the metric for each of the number of beams of the serving cell and for each of the number of beams of the non-serving cell.

Aspect 12: The method of any of aspects 10 through 11, further comprising: receiving an indication of a metric for a subset of the set of beams of the serving cell and for a the non-serving cell of the UE, wherein the L1 report comprises the indication.

Aspect 13: The method of aspect 12, further comprising: receiving an indication of the metric for a beam of the non-serving cell for which the metric is highest, wherein the L1 report comprises the indication.

Aspect 14: The method of any of aspects 12 through 13, further comprising: receiving an indication of an aggregate value of the metric for a set of beams of the non-serving cell, wherein the L1 report comprises the indication.

Aspect 15: The method of any of aspects 12 through 14, wherein the metric comprises a RSRP or a SINR.

Aspect 16: The method of any of aspects 10 through 15, further comprising: receiving a joint index comprising an index of the non-serving cell and an index of beam of the non-serving cell, wherein the L1 report comprises the joint index.

Aspect 17: The method of any of aspects 10 through 16, further comprising: receiving an index of the non-serving cell, wherein the L1 report comprises the index.

Aspect 18: The method of aspect 17, wherein the index comprises a physical cell identifier of the non-serving cell or an identifier of the non-serving cell relative to a set of cells configured for the UE.

Aspect 19: An apparatus for wireless communication at a UE, comprising a processor; memory coupled with the processor; and instructions stored in the memory and executable by the processor to cause the apparatus to perform a method of any of aspects 1 through 9.

Aspect 20: An apparatus for wireless communication at a UE, comprising at least one means for performing a method of any of aspects 1 through 9.

Aspect 21: A non-transitory computer-readable medium storing code for wireless communication at a UE, the code comprising instructions executable by a processor to perform a method of any of aspects 1 through 9.

Aspect 22: An apparatus for wireless communication at a base station, comprising a processor; memory coupled with the processor; and instructions stored in the memory and executable by the processor to cause the apparatus to perform a method of any of aspects 10 through 18.

Aspect 23: An apparatus for wireless communication at a base station, comprising at least one means for performing a method of any of aspects 10 through 18.

Aspect 24: A non-transitory computer-readable medium storing code for wireless communication at a base station, the code comprising instructions executable by a processor to perform a method of any of aspects 10 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving control signaling from a base station, the control signaling indicating a configuration for transmitting, from the UE, a layer one report associated with a set of beams of a serving cell of the UE and with a non-serving cell of the UE, the set of beams of the serving cell associated with indices and the non-serving cell associated with joint indices, the joint indices each comprising an index of a beam and an index or an identifier of the non-serving cell;
   generating the layer one report based at least in part on the configuration, the layer one report based at least in part on a metric associated with the set of beams of the serving cell of the UE and with the non-serving cell of the UE; and
   transmitting the generated layer one report to the base station.

2. The method of claim 1, further comprising:
   receiving, from the base station, an indication of a number of beams of the serving cell and a number of beams of the non-serving cell, wherein the layer one report comprises an indication of the metric for each of the number of beams of the set of beams of the serving cell and for each of the number of beams of the non-serving cell.

3. The method of claim 1, further comprising:
   determining the metric for each beam of the set of beams of the serving cell of the UE and for the non-serving cell of the UE, wherein the layer one report comprises an indication of the metric for a subset of the set of beams for the serving cell and for the non-serving cell of the UE.

4. The method of claim 3, wherein determining the metric for the non-serving cell of the UE comprises:
determining the metric for each beam of a set of beams of the non-serving cell, wherein the layer one report comprises an indication of the metric associated with a beam of the set of beams for which the metric is highest.

5. The method of claim 3, wherein determining the metric for the non-serving cell of the UE comprises:
determining the metric for each beam of the set of beams of the non-serving cell, wherein the layer one report comprises an indication of an aggregate value of the metric for each beam of the set of beams of the non-serving cell.

6. The method of claim 1, further comprising:
determining the index of the non-serving cell and the index of the beam of the non-serving cell; and
determining a joint index of the joint indices comprising the index of the non-serving cell and the index of the beam of the non-serving cell, wherein the layer one report comprises the joint index.

7. The method of claim 1, further comprising:
determining the index of the non-serving cell, wherein the layer one report comprises the index.

8. The method of claim 7, wherein the index comprises a physical cell identifier associated with the non-serving cell or an identifier of the non-serving cell relative to a set of cells configured for the UE.

9. The method of claim 1, wherein the metric comprises a reference signal received power or a signal-to-interference-plus-noise ratio.

10. A method for wireless communication at a base station, comprising:
transmitting control signaling to a user equipment (UE), the control signaling indicating a configuration for the UE to transmit a layer one report associated with a set of beams of a serving cell of the UE and associated with a non-serving cell of the UE, the set of beams of the serving cell associated with indices and the non-serving cell associated with joint indices, the joint indices each comprising an index of a beam and an index or an identifier of the non-serving cell; and
receiving the layer one report from the UE in response to transmitting the control signaling.

11. The method of claim 10, further comprising:
transmitting, to the UE, an indication of a number of beams of the serving cell and a number of beams of the non-serving cell, wherein the layer one report comprises an indication of a metric for each of the number of beams of the serving cell and for each of the number of beams of the non-serving cell.

12. The method of claim 10, further comprising:
receiving an indication of a metric for a subset of the set of beams of the serving cell and for the non-serving cell of the UE, wherein the layer one report comprises the indication.

13. The method of claim 12, further comprising:
receiving the indication of the metric for a beam of the non-serving cell for which the metric is highest, wherein the layer one report comprises the indication.

14. The method of claim 12, further comprising:
receiving an indication of an aggregate value of the metric for the set of beams of the non-serving cell, wherein the layer one report comprises the indication.

15. The method of claim 12, wherein the metric comprises a reference signal received power or a signal-to-interference-plus-noise ratio.

16. The method of claim 10, further comprising:
receiving a joint index of the joint indices comprising the index of the non-serving cell and the index of a beam of the non-serving cell, wherein the layer one report comprises the joint index.

17. The method of claim 10, further comprising:
receiving the index of the non-serving cell, wherein the layer one report comprises the index.

18. The method of claim 17, wherein the index comprises a physical cell identifier of the non-serving cell or an identifier of the non-serving cell relative to a set of cells configured for the UE.

19. An apparatus for wireless communication at a user equipment (UE), comprising:
a processor;
memory coupled with the processor; and
instructions stored in the memory and executable by the processor to cause the apparatus to:
receive control signaling from a base station, the control signaling indicating a configuration for transmitting, from the UE, a layer one report associated with a set of beams of a serving cell of the UE and with a non-serving cell of the UE, the set of beams of the serving cell associated with indices and the non-serving cell associated with joint indices, the joint indices each comprising an index of a beam and an index or an identifier of the non-serving cell;
generate the layer one report based at least in part on the configuration, the layer one report based at least in part on a metric associated with the set of beams of the serving cell of the UE and with the non-serving cell of the UE; and
transmit the generated layer one report to the base station.

20. The apparatus of claim 19, wherein the instructions are further executable by the processor to cause the apparatus to:
receive, from the base station, an indication of a number of beams of the serving cell and a number of beams of the non-serving cell, wherein the layer one report comprises an indication of the metric for each of the number of beams of the set of beams of the serving cell and for each of the number of beams of the non-serving cell.

21. The apparatus of claim 19, wherein the instructions are further executable by the processor to cause the apparatus to:
determine the metric for each beam of the set of beams of the serving cell of the UE and for the non-serving cell of the UE, wherein the layer one report comprises an indication of the metric for a subset of the set of beams and for the non-serving cell of the UE.

22. The apparatus of claim 21, wherein the instructions to determine the metric for the non-serving cell of the UE are executable by the processor to cause the apparatus to:
determine the metric for each beam of the set of beams of the non-serving cell, wherein the layer one report comprises an indication of the metric associated with a beam of the set of beams for which the metric is highest.

23. The apparatus of claim 21, wherein the instructions to determine the metric for the non-serving cell of the UE are executable by the processor to cause the apparatus to:
determine the metric for each beam of the set of beams of the non-serving cell, wherein the layer one report comprises an indication of an aggregate value of the metric for each beam of the set of beams of the non-serving cell.

24. The apparatus of claim 19, wherein the instructions are further executable by the processor to cause the apparatus to:
determine the index of the non-serving cell and the index of the beam of the non-serving cell; and
determine a joint index of the joint indices comprising the index of the non-serving cell and the index of the beam of the non-serving cell, wherein the layer one report comprises the joint index.

25. The apparatus of claim 19, wherein the instructions are further executable by the processor to cause the apparatus to:
determine the index of the non-serving cell, wherein the layer one report comprises the index.

26. An apparatus for wireless communication at a base station, comprising:
a processor;
memory coupled with the processor; and
instructions stored in the memory and executable by the processor to cause the apparatus to:
transmit control signaling to a user equipment (UE), the control signaling indicating a configuration for the UE to transmit a layer one report associated with a set of beams of a serving cell of the UE and associated with a non-serving cell of the UE, the set of beams of the serving cell associated with indices and the non-serving cell associated with joint indices, the joint indices each comprising an index of a beam and an index or an identifier of the non-serving cell; and
receive the layer one report from the UE in response to transmitting the control signaling.

27. The apparatus of claim 26, wherein the instructions are further executable by the processor to cause the apparatus to:
transmit, to the UE, an indication of a number of beams of the serving cell and a number of beams of the non-serving cell, wherein the layer one report comprises an indication of a metric for each of the number of beams of the serving cell and for each of the number of beams of the non-serving cell.

28. The apparatus of claim 26, wherein the instructions are further executable by the processor to cause the apparatus to:
receive an indication of a metric for a subset of the set of beams of the serving cell and for the non-serving cell of the UE, wherein the layer one report comprises the indication.

29. The apparatus of claim 26, wherein the instructions are further executable by the processor to cause the apparatus to:
receive a joint index comprising the index of the non-serving cell and the index of a beam of the non-serving cell, wherein the layer one report comprises the joint index.

30. The apparatus of claim 26, wherein the instructions are further executable by the processor to cause the apparatus to:
receive the index of the non-serving cell, wherein the layer one report comprises the index.

* * * * *